United States Patent
Arai

(10) Patent No.: US 7,602,525 B2
(45) Date of Patent: Oct. 13, 2009

(54) METHOD OF PRODUCING COLOR CONVERSION TABLE, IMAGE PROCESSING DEVICE, IMAGE PROCESSING METHOD, PROGRAM AND RECORDING MEDIUM

(75) Inventor: Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 658 days.

(21) Appl. No.: 10/501,061

(22) PCT Filed: Jan. 9, 2003

(86) PCT No.: PCT/JP03/00110

§ 371 (c)(1),
(2), (4) Date: Feb. 7, 2005

(87) PCT Pub. No.: WO03/061274

PCT Pub. Date: Jul. 24, 2003

(65) Prior Publication Data

US 2005/0128495 A1 Jun. 16, 2005

(30) Foreign Application Priority Data

| Jan. 9, 2002 | (JP) | ............................. 2002-002061 |
| Mar. 19, 2002 | (JP) | ............................. 2002-076424 |
| Mar. 19, 2002 | (JP) | ............................. 2002-077132 |
| Mar. 22, 2002 | (JP) | ............................. 2002-081040 |
| May 9, 2002 | (JP) | ............................. 2002-133732 |

(51) Int. Cl.
*G06F 15/00* (2006.01)
*G06F 3/00* (2006.01)
*G06K 15/00* (2006.01)
*G06K 9/00* (2006.01)
*G06K 9/40* (2006.01)

(52) U.S. Cl. .......................... 358/1.9; 358/518; 358/2.1; 382/167; 382/254

(58) Field of Classification Search ................. 358/523, 358/524
See application file for complete search history.

(56) References Cited

U.S. PATENT DOCUMENTS

| 5,416,855 | A | * | 5/1995 | Geiger ........................ 382/254 |
| 5,557,712 | A | | 9/1996 | Guay |
| 6,424,747 | B1 | | 7/2002 | Morikawa |
| 6,724,507 | B1 | * | 4/2004 | Ikegami et al. .............. 358/518 |
| 2002/0145744 | A1 | * | 10/2002 | Kumada et al. .............. 358/1.9 |

FOREIGN PATENT DOCUMENTS

EP 0 611 231 A1 8/1994

(Continued)

OTHER PUBLICATIONS

Abstract of Japanese Patent Publication No. 63-254863, Pub. Date: Oct. 21, 1988, Patent Abstracts of Japan.

(Continued)

*Primary Examiner*—Twyler L Haskins
*Assistant Examiner*—Barbara D Reinier
(74) *Attorney, Agent, or Firm*—Martine Penilla & Gencarella, LLP

(57) ABSTRACT

A method of producing a color conversion table capable of enhancing continuity in an image-data color conversion, an image processing device and a method using the color conversion table, a program and a recording medium. The image processing device performs an image processing by using a color conversion table produced by using functions for evaluating a smoothing level at each element of lattice point data after color conversion by a color conversion table. Functions for evaluating the above smoothing level include a function based on the twisted quantity of ink-quantity vector, a function based on a twisted quantity at a virtual CMY, a function based on a deviation from a target ink quantity, a function based on a deviation from a target virtual CMY, a function based on a failure to meet an ink quantity limitation, a function based on ink quantity reduced to minus, and a function based on ink generation.

10 Claims, 19 Drawing Sheets

FOREIGN PATENT DOCUMENTS

| | | |
|---|---|---|
| JP | 63-254863 | 10/1988 |
| JP | 01-165441 | 6/1989 |
| JP | 01-166669 | 6/1989 |
| JP | 06-225131 | 8/1994 |
| JP | 06-225132 | 8/1994 |
| JP | 06-233129 | 8/1994 |
| JP | 06-253139 | 9/1994 |
| JP | 09-509295 | 9/1997 |
| JP | 11-155077 | 6/1999 |
| JP | 2000-209449 | 7/2000 |
| JP | 2002-002061 | 1/2002 |
| JP | 2002-076424 | 3/2002 |
| JP | 2002-077132 | 3/2002 |
| JP | 2002-133732 | 5/2002 |
| JP | 2003-204443 | 7/2003 |

OTHER PUBLICATIONS

Abstract of Japanese Patent Publication No. 01-165441, Pub. Date: Jun. 29, 1989, Patent Abstracts of Japan.
Abstract of Japanese Patent Publication No. 01-166669, Pub. Date: Jun. 30, 1989, Patent Abstracts of Japan.
Abstract of Japanese Patent Publication No. 06-225131, Pub. Date: Aug. 12, 1994, Patent Abstracts of Japan.
Abstract of Japanese Patent Publication No. 06-225132, Pub. Date: Aug. 12, 1994, Patent Abstracts of Japan.
Abstract of Japanese Patent Publication No. 06-233129, Pub. Date: Aug. 19, 1994, Patent Abstracts of Japan.
Abstract of Japanese Patent Publication No. 06-253139, Pub. Date: Sep. 9, 1994, Patent Abstracts of Japan.
Abstract of Japanese Patent Publication No. 11-155077, Pub. Date: Jun. 8, 1999, Patent Abstracts of Japan.
Abstract of Japanese Patent Publication No. 2000-209449, Pub. Date: Jul. 28, 2000, Patent Abstracts of Japan.
Abstract of Japanese Patent Publication No. 2002-002061, Pub. Date: Jan. 8, 2002, Patent Abstracts of Japan.
Abstract of Japanese Patent Publication No. 2002-076424, Pub. Date: Mar. 15, 2002, Patent Abstracts of Japan.
Abstract of Japanese Patent Publication No. 2002-077132, Pub. Date: Mar. 15, 2002, Patent Abstracts of Japan.
Abstract of Japanese Patent Publication No. 2002-133732, Pub. Date: May 10, 2002, Patent Abstracts of Japan.
Abstract of Japanese Patent Publication No. 2003-204443, Pub. Date: Jul. 18, 2003, Patent Abstracts of Japan.

* cited by examiner

METHOD OF PRODUCING COLOR CONVERSION TABLE, IMAGE PROCESSING DEVICE, IMAGE PROCESSING METHOD, PROGRAM AND RECORDING MEDIUM

TECHNICAL FIELD

The present invention relates to production of a color conversion table capable of enhancing continuity of color conversion of image data.

BACKGROUND ART

A color reproducing device such as a scanner, a monitor, a printer, and a projector is different in a color reproduction characteristic due to difference in whether self-luminous or reflective, difference in tone representation, difference in primary colors to be used, and the like, and thus, even if the same RGB values, CMY values, or CMYK values are used, reproduced colors are largely different from one another. Therefore, to reproduce the same color on different color reproducing devices, it is necessary to represent a color in a device-independent space where a color is represented independently of characteristics of the devices, and to carry out so-called color management which determines actual ink quantities or monitor RGB values so that the colors are the same in the space.

For example, as for a color printer, on the assumption that the RGB values of a scanner, a printer, a monitor, and the like are sRGB values, which is an international standard, Lab values are calculated according to the standard from the RGB values, and then, the Lab values are color-converted to a combination of inks for reproducing a color closest to the Lab values among the colors reproducible by the printer. In general, this conversion is carried out at a predetermined grid interval in the RGB space, thereby producing a color conversion table (LUT), which carries out color conversion from RGB values to ink quantities in advance, and the color conversion table is installed in a printer driver or the like to reproduce desired colors.

Generally, a color reproduction characteristic of a printer is determined by a characteristic of what combination of inks is used (referred to as "separation" hereinafter) for input RGB values. This separation is designed to satisfy various conditions, and thus, often causes discontinuous changes in the ink quantities. Therefore, there are always areas where the ink quantities discontinuously change on a color conversion table created by simply using this separation characteristic, resulting in tone jumps. If there exists the discontinuity in the lattice, a large error occurs in linear interpolation carried out for obtaining data between the lattice points, thereby also causing a twist in the color in this case.

The present invention is devised to solve the above problems, and has a first object of providing a method of producing a color conversion table capable of restraining the color twists and the tone jumps in the output image as much as possible by correcting the discontinuities in the separation characteristic, and thus, enhancing the continuity of the color conversion table, and providing an image processing device, a method, a program, and a recording medium which use the color conversion table.

If simple smoothing is applied to the table to solve the discontinuities in the lattice, the chroma may decrease across the entire table.

Further, the present invention is devised also to solve the above problem, and has a second object of providing a method of producing a color conversion table capable of restraining the color twists and the tone jumps as much as possible while maintaining the chroma, and providing an image processing device, an image processing method, a program, and a recording medium which use the color conversion table.

Further, the present invention is devised to solve the above problem, and has a third object of providing a device, a method, and a program for producing a profile enabling color management among different color reproducing devices while restraining the color twists and the tone jumps of the output image as much as possible, and providing a recording medium for recording the program.

DISCLOSURE OF INVENTION

The present invention described in claim 1, is a method for producing a color conversion table by using a smoothing level evaluation function used for evaluating a smoothing level at respective lattice point data after color conversion by the color conversion table.

The present invention described in claim 2, is an image processing device carrying out image processing using a color conversion table produced by using a smoothing level evaluation function used for evaluating a smoothing level at respective lattice point data after color conversion by the color conversion table.

The present invention described in claim 3, is the image processing device according to claim 2, wherein said smoothing level evaluation function includes an evaluation function based on a twisted quantity of an ink-quantity vector before and after the conversion using the color conversion table.

In the above description, "a twisted quantity of an ink-quantity vector before and after the conversion using the color conversion table" implies a twisted quantity defined by the ink-quantity vectors between all grid points neighboring each other in an ink-quantity space represented by the ink quantities after the conversion corresponding to the respective grid points represented by input values (RGB) of the color conversion table.

The present invention described in claim 4, is the image processing device according to claim 2 or 3, wherein said smoothing level evaluation function includes an evaluation function based on a twisted quantity in a virtual CMY space.

In the above description, "a twisted quantity in a virtual CMY space" implies a twisted quantity defined by the three-dimensional vectors between all grid points neighboring each other in a space (virtual CMY space) three-dimensionalized by linear combination of an I-dimensional space (I is the number of inks) relating to the ink quantities.

The present invention described in claim 5, is the image processing device according to any one of claims 2 through 4, wherein said twisted quantities are corrected both in said ink-quantity space and said three-dimensionalized virtual CMY space so as to correct the twisted quantities while maintaining continuity of the space before and after compression of the dimension.

The present invention described in claim 6, is the image processing device according to any one of claims 2 through 5, wherein said smoothing level evaluation function includes an evaluation function based on a deviation level from a target ink quantity.

The present invention described in claim 7, is the image processing device according to any one of claims 2 through 6, wherein said smoothing level evaluation function includes an evaluation function based on a deviation level from target virtual CMY.

The present invention described in claim 8, is the image processing device according to any one of claims 2 through 7, wherein said smoothing level evaluation function includes an evaluation function based on an excess level from an ink quantity limitation.

The present invention described in claim 9, is the image processing device according to any one of claims 2 through 8, wherein said smoothing level evaluation function includes an evaluation function based on an ink quantity reduced to minus.

The present invention described in claim 10, is the image processing device according to any one of claims 2 through 9, wherein said smoothing level evaluation function includes an evaluation function based on ink generation.

In the above description, "an evaluation function based on ink generation" implies a function used for evaluating whether an ink is produced at a point where no ink quantity originally is present on the color conversion table before the smoothing.

The present invention described in claim 11, is an image processing method for carrying out image processing using a color conversion table produced by using a smoothing level evaluation function used for evaluating a smoothing level at respective lattice point data after color conversion by the color conversion table.

The present invention described in claim 12, is a program of instructions for execution by the computer to perform an image-processing using a color conversion table produced by using a smoothing level evaluation function used for evaluating a smoothing level at respective lattice point data after color conversion by the color conversion table.

The present invention described in claim 13, is a method for producing a color conversion table by using a smoothing level evaluation function used for evaluating a smoothing level at respective lattice point data after color conversion by the color conversion table in a perceptually uniform color space such as the Lab space.

The present invention described in claim 14, is an image processing device carrying out image processing using a color conversion table produced by using a smoothing level evaluation function used for evaluating a smoothing level at respective lattice point data after color conversion by the color conversion table in a perceptually uniform color space such as the Lab space.

The present invention described in claim 15, is the image processing device according to claim 14, wherein said smoothing level evaluation function includes an evaluation function based on a twisted quantity due to the perceptually uniform color space such as the Lab space before and after the color conversion using the color conversion table.

The present invention described in claim 16, is the image processing device according to claim 14 or 15, wherein said smoothing level evaluation function includes an evaluation function based on a deviation level from the target perceptually uniform color space such as the Lab space.

The present invention described in claim 17, is an image processing method carrying out image processing using a color conversion table produced by using a smoothing level evaluation function used for evaluating a smoothing level at respective lattice point data after color conversion by the color conversion table in a perceptually uniform color space such as the Lab space.

The present invention described in claim 18, is a program of instructions for execution by the computer to perform an image-processing using a color conversion table produced by using a smoothing level evaluation function used for evaluating a smoothing level at respective lattice point data after color conversion by the color conversion table in a perceptually uniform color space such as the Lab space.

The present invention described in claim 19, is a method for producing a color conversion table by using a smoothing level evaluation function used for evaluating a smoothing level at respective lattice point data after color conversion by the color conversion table in a color space such as the CMY space.

The present invention described in claim 20, is an image processing device carrying out image processing using a color conversion table produced by using a smoothing level evaluation function used for evaluating a smoothing level at respective lattice point data after color conversion by the color conversion table in a color space such as the CMY space.

The present invention described in claim 21, is the image processing device according to claim 20, wherein said smoothing level evaluation function includes an evaluation function based on a twisted quantity due to the color space such as the CMY space before and after the color conversion using the color conversion table.

The present invention described in claim 22, is the image processing device according to claim 20 or 21, wherein said smoothing level evaluation function includes an evaluation function based on a deviation level from target CMY values.

The present invention described in claim 23, is the image processing device according to any one of claims 20 through 22, wherein said smoothing level evaluation function includes an evaluation function preventing the CMY value from exceeding 255.

The present invention described in claim 24, is the image processing device according to any one of claims 20 through 23, wherein said smoothing level evaluation function includes an evaluation function preventing the CMY value from being reduced to minus.

The present invention described in claim 25, is an image processing method carrying out image processing using a color conversion table produced by using a smoothing level evaluation function used for evaluating a smoothing level at respective lattice point data after color conversion by the color conversion table in a color space such as the CMY space.

The present invention described in claim 26, is a program of instructions for execution by the computer to perform an image-processing using a color conversion table produced by using a smoothing level evaluation function used for evaluating a smoothing level at respective lattice point data after color conversion by the color conversion table in a color space such as the CMY space.

The present invention described in claim 27, is a method for producing a color conversion table by using a smoothing level evaluation function used for evaluating a smoothing level of color data at respective lattice points after color conversion by the color conversion table, and simultaneously, carrying out the color conversion such that the chroma represented by the color data at the respective lattice points is maintained approximately constant before and after said smoothing.

The present invention described in claim 28, is an image processing device carrying out image processing using a color conversion table produced by using a smoothing level evaluation function used for evaluating a smoothing level of color data at respective lattice points after color conversion by the color conversion table, and simultaneously, carrying out the color conversion such that the chroma represented by the color data at the respective lattice points is maintained approximately constant before and after said smoothing.

The present invention described in claim 29, is the image processing device according to claim 28, wherein said color conversion table carries out the color conversion such that, as for such color data at the lattice point that the chroma represented by the color data decreases after said smoothing compared with the chroma represented by the color data before said smoothing, the chroma represented by the color data is maintained approximately constant before and after said smoothing.

The present invention described in claim 30, is the image processing device according to claim 29, wherein said color conversion table carries out the color conversion such that, as for such color data at the lattice point that a ratio of the chroma represented by the color data after said smoothing to the maximum chroma determined by the hue and lightness represented by the color data after said smoothing decreases compared with a ratio of the chroma represented by the color data before said smoothing to the maximum chroma determined by the hue and lightness represented by the color data after said smoothing, the chroma represented by the color data is maintained approximately constant before and after said smoothing.

The present invention described in claim 31, is the image processing device according to claim 28 or 29, wherein said color conversion table carries out the color conversion such that, as for such color data as presenting the maximum chroma, the chroma represented by the color data is maintained approximately constant before and after said smoothing.

The present invention described in claim 32, is the image processing device according to claim 28 or 29, wherein said color conversion table carries out the color conversion such that, as for such color data as not including at least one color of a plurality of element colors constituting the color data as a component color, the chroma represented by the color data is maintained approximately constant before and after said smoothing.

The present invention described in claim 33, is the image processing device according to any one of claims 28 through 32, wherein said color conversion table carries out the color conversion such that a ratio of the chroma represented by the color data at the lattice point after said smoothing to the maximum chroma determined by the hue and lightness represented by the color data after said smoothing, and a ratio of the chroma represented by the color data before said smoothing to the maximum chroma determined by the hue and lightness represented by the color data after said smoothing are maintained approximately constant.

The present invention described in claim 34, is the image processing device according to any one of claims 28 through 33, wherein said smoothing level evaluation function includes an evaluation function based on a twisted quantity of an ink-quantity vector before and after the conversion using the color conversion table.

The present invention described in claim 35, is the image processing device according to any one of claims 28 through 34, wherein said smoothing level evaluation function includes an evaluation function based on a twisted quantity in a virtual CMY space.

The present invention described in claim 36, is the image processing device according to any one of claims 28 through 35, wherein said twisted quantities are corrected both in said ink-quantity space and said three-dimensionalized virtual CMY space so as to correct the twisted quantities while maintaining continuity of the space before and after compression of the dimension.

The present invention described in claim 37, is the image processing device according to any one of claims 28 through 36, wherein said smoothing level evaluation function includes an evaluation function based on a deviation level from a target ink quantity.

The present invention described in claim 38, is the image processing device according to any one of claims 28 through 37, wherein said smoothing level evaluation function includes an evaluation function based on a deviation level from target virtual CMY.

The present invention described in claim 39, is the image processing device according to claim 38, wherein said color conversion table carries out the color conversion such that the chroma represented by the color data is maintained approximately constant before and after said smoothing in said target virtual CMY.

The present invention described in claim 40, is the image processing device according to any one of claims 28 through 39, wherein said smoothing level evaluation function includes an evaluation function based on an excess level from an ink quantity limitation.

The present invention described in claim 41, is the image processing device according to any one of claims 28 through 40, wherein said smoothing level evaluation function includes an evaluation function based on an ink quantity reduced to minus.

The present invention described in claim 42, is the image processing device according to any one of claims 28 through 41, wherein said smoothing level evaluation function includes an evaluation function based on ink generation.

The present invention described in claim 43, is an image processing method carrying out image processing using a color conversion table produced by using a smoothing level evaluation function used for evaluating a smoothing level of color data at respective lattice points after color conversion by the color conversion table, and simultaneously, carrying out the color conversion such that the chroma represented by the color data at the respective lattice points is maintained approximately constant before and after said smoothing.

The present invention described in claim 44, is a program of instructions for execution by the computer to perform an image-processing using a color conversion table produced by using a smoothing level evaluation function used for evaluating a smoothing level of color data at respective lattice points after color conversion by the color conversion table, and simultaneously, carrying out the color conversion such that the chroma represented by the color data at the respective lattice points is maintained approximately constant before and after said smoothing.

The present invention described in claim 45, is a profile producing device producing a profile by using a color chart output by an image output device comprising: a smoothed table producing means for producing a color conversion table smoothed by using a smoothing level evaluation function used for evaluating a smoothing level at respective lattice point data after color conversion by the color conversion table; a color chart producing means for causing the image output device to output the color chart based on desired image input data using the smoothed color conversion table produced by said smoothed table producing means; a colorimetry means for obtaining a colorimetry value of the color chart; and a profile producing means for producing a profile from a correspondence between said desired image input data and the colorimetry value corresponding to said image input data.

The present invention described in claim 46, is the profile producing device according to claim 45, wherein said desired image input data include a device value depending on a color reproduction characteristic of the image output device.

The present invention described in claim 47, is the profile producing device according to claim 46, wherein the device value depending on the color reproduction characteristic of said image output device includes RGB values, CMY values, or CMYK values.

The present invention described in claim 48, is the profile producing device according to any one of claims 45 through 47, wherein said colorimetry value is a colorimetry value indicating appearance of a color.

The present invention described in claim 49, is the profile producing device according to claim 48, wherein said colorimetry value indicating the appearance of the color includes Lab values, Luv values, XYZ values, or CIE CAM 97S.

The present invention described in claim 50, is the image processing device according to any one of claims 45 through 49, wherein said smoothing level evaluation function includes an evaluation function based on a twisted quantity of an ink-quantity vector before and after the conversion using the color conversion table.

The present invention described in claim 51, is the image processing device according to any one of claims 45 through 50, wherein said smoothing level evaluation function includes an evaluation function based on a twisted quantity in a virtual CMY space.

The present invention described in claim 52, is the image processing device according to any one of claims 45 through 51, wherein said twisted quantities are corrected both in said ink-quantity space and said three-dimensionalized virtual CMY space so as to correct the twisted quantities while maintaining continuity of the space before and after compression of the dimension.

The present invention described in claim 53, is the image processing device according to any one of claims 45 through 52, wherein said smoothing level evaluation function includes an evaluation function based on a deviation level from a target ink quantity.

The present invention described in claim 54, is the image processing device according to any one of claims 45 through 53, wherein said smoothing level evaluation function includes an evaluation function based on a deviation level from target virtual CMY.

The present invention described in claim 55, is the image processing device according to any one of claims 45 through 54, wherein said smoothing level evaluation function includes an evaluation function based on an excess level from an ink quantity limitation.

The present invention described in claim 56, is the image processing device according to any one of claims 45 through 55, wherein said smoothing level evaluation function includes an evaluation function based on an ink quantity reduced to minus.

The present invention described in claim 57, is the image processing device according to any one of claims 45 through 56, wherein said smoothing level evaluation function includes an evaluation function based on ink generation.

The present invention described in claim 58, is a profile producing method producing a profile by using a color chart output by an image output device comprising: a smoothed table producing step for producing a color conversion table smoothed by using a smoothing level evaluation function used for evaluating a smoothing level at respective lattice point data after color conversion by the color conversion table; a color chart producing step for causing the image output device to output the color chart based on desired image input data using the smoothed color conversion table produced by said smoothed table producing step; a colorimetry step for obtaining a colorimetry value of the color chart; and a profile producing step for producing a profile from a correspondence between said desired image input data and the colorimetry value corresponding to said image input data.

The present invention described in claim 59, is a program of instructions for execution by the computer to perform a profile producing method producing a profile by using a color chart output by an image output device, said profile producing method comprising: a smoothed table producing step for producing a color conversion table smoothed by using a smoothing level evaluation function used for evaluating a smoothing level at respective lattice point data after color conversion by the color conversion table; a color chart producing step for causing the image output device to output the color chart based on desired image input data using the smoothed color conversion table produced by said smoothed table producing step; a colorimetry step for obtaining a colorimetry value of the color chart; and a profile producing step for producing a profile from a correspondence between said desired image input data and the colorimetry value corresponding to said image input data.

The present invention described in claim 60, is a recording medium readable by a computer recording a program according to any one of claims 56, 18, 26, and 44.

The present invention described in claim 61, is a method for producing a color conversion table using a plurality of costs used for evaluating a level of smoothing at respective lattice point data after color conversion using the color conversion table.

BEST MODE FOR CARRYING OUT THE INVENTION

A description will now be given of embodiments of the present invention with reference to drawings. It should be noted that a "color conversion table" implies a table (LUT) providing a function of converting input values (such as RGB values) to other values (such as CcMmYK values which are ink quantities) whether it carries out color correction or not in the present specification, and includes an LUT without color correction to which smoothing described below is applied. On the other hand, a "color correction table" is a table produced by a color management processing based on the input RGB values which are assumed to comply with conversion equation defined by international standard (such as the sRGB standard), and is a table (LUT) having a function of carrying out color correction such that a color shown when the input RGB values are represented on a display and a color shown when the input RGB values are represented in a printer output match each other.

(A) First Embodiment (Production of Color Conversion Table Capable of Enhancing Continuity of Color Conversion of Image Data)

(A-1) First Example

Case using an evaluation function based on twisted quantities in ink quantities

Figure 1:
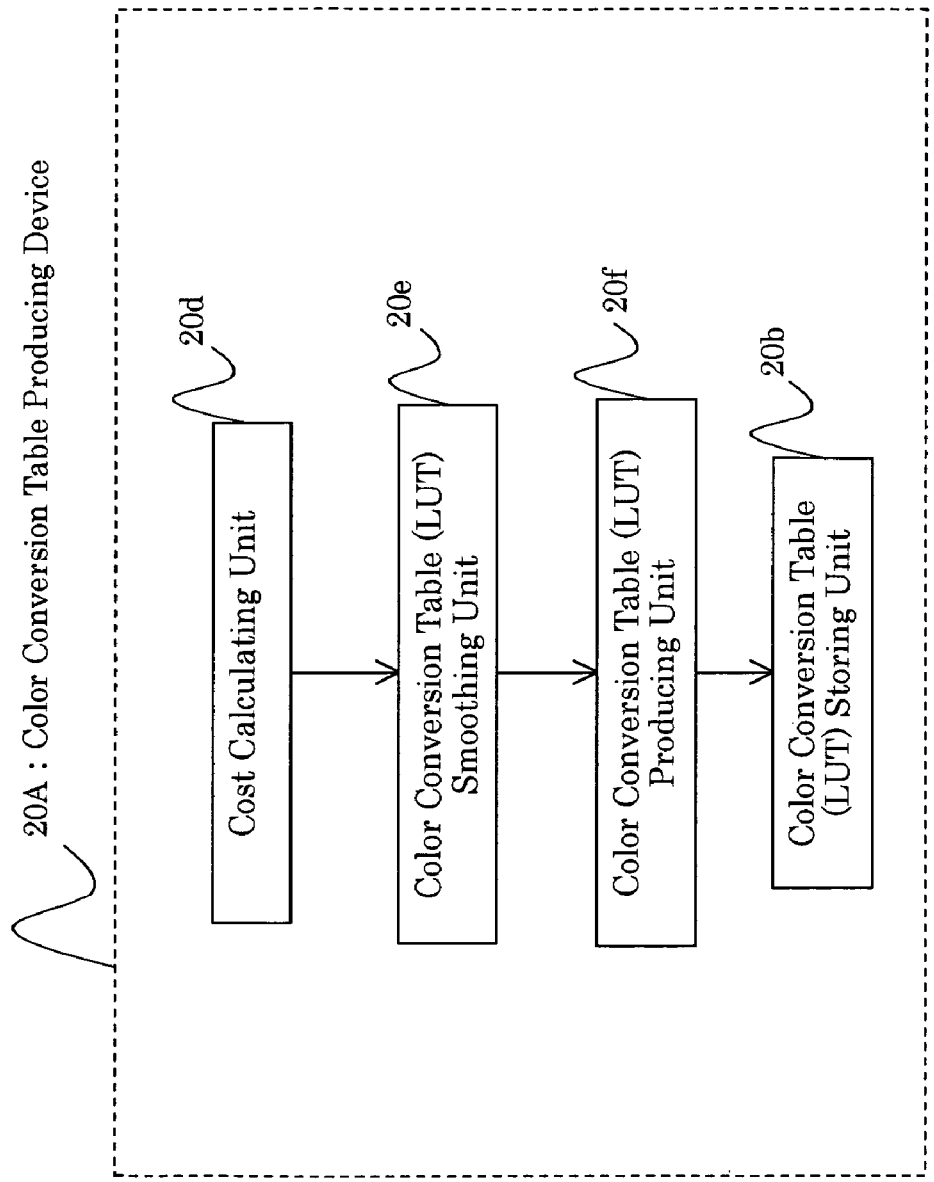
FIG. 1 is a function block diagram of a color conversion table producing device according to an embodiment of the present invention.
Figure 3:
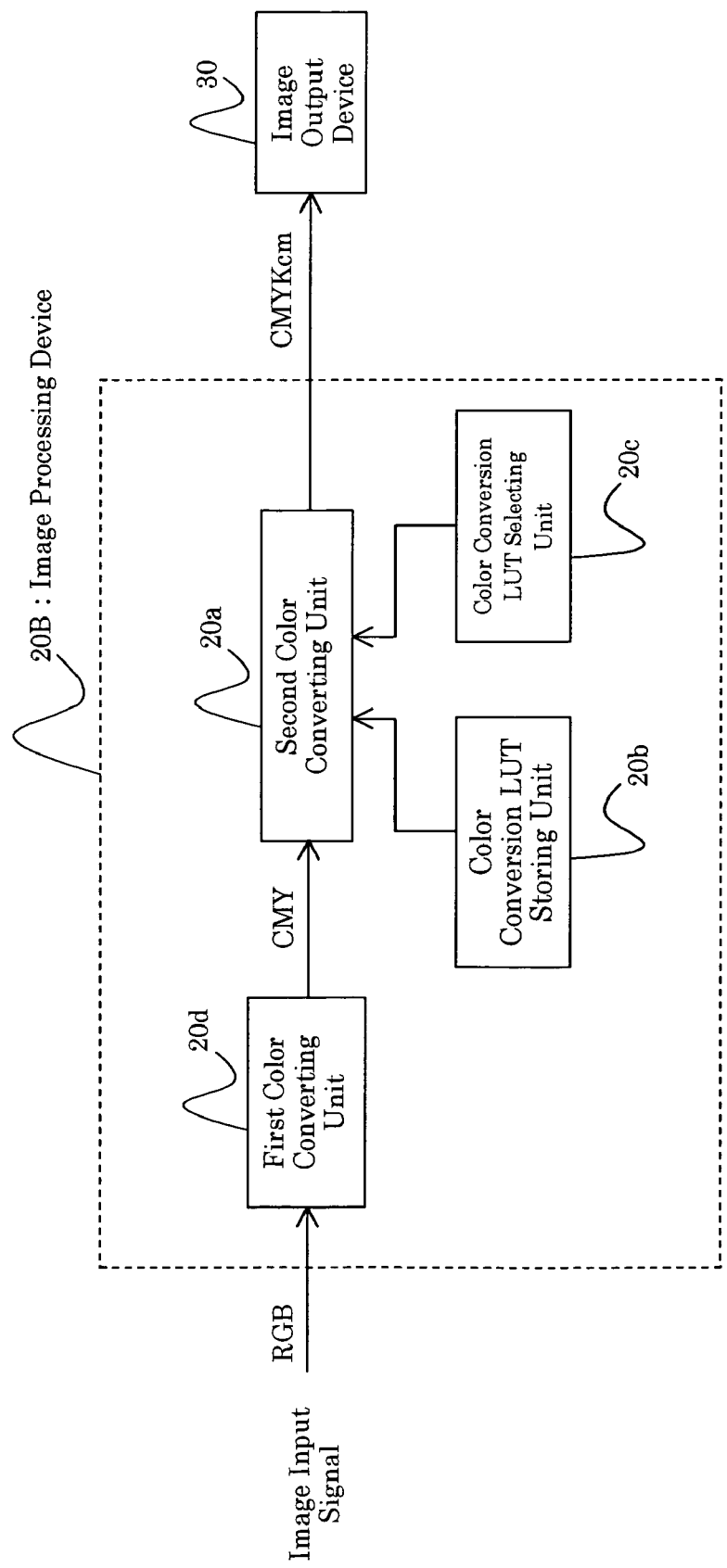
FIG. 3 is a function block diagram of an image processing device according to the embodiment of the present invention.

FIG. 1 is a function block diagram of a color conversion table producing device according to an embodiment of the present invention, and FIG. 3 is a function block diagram of an image processing device according to the embodiment of the present invention.

Hardware Constitution

Figure 2:
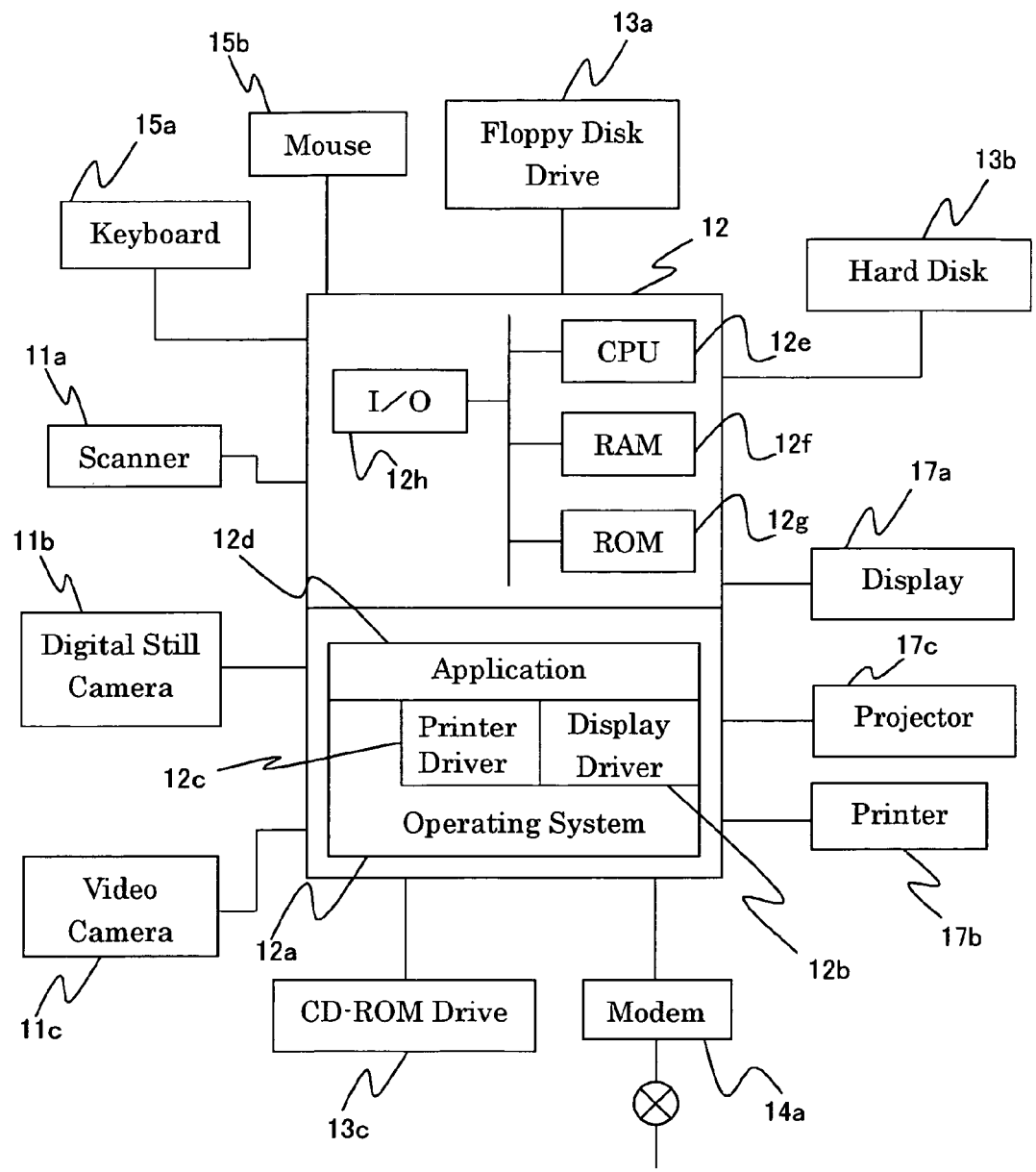
FIG. 2 is a block diagram for showing a constitution of the color conversion table producing device and the image processing apparatus according to the present invention.

FIG. 2 is a schematic block diagram showing an example of a concrete hardware constitution of the color conversion table producing device and the image processing apparatus according to the present invention.

The present embodiment employs a computer system as an example of hardware for the color conversion table producing device and the image processing apparatus. FIG. 2 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16,7 million colors by 256-gradation display in three primary colors including R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM as required. A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a, a color printer 17b and a projector 17c as image output devices. The display 17a is provides with a display area including 800 pixels in the horizontal direction and 600 pixels in the vertical direction, and 16,7 million colors are displayed on the individual pixels. This resolution is an example, and the resolution may be changed to 640×480 or 1024×768 as needed.

The color printer 17b is an ink jet printer, and prints an image on a print sheet as a medium with color ink of four colors including C, M, Y, and K. As image resolution, high density print such as 360×360 dpi or 720×720 dpi is available, and as gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base program, and a display driver (DSP DRV) 12b for making the display 17a the displaying process, a printer driver (PRT DRV) 12c for making the color printer 17b the printing process and a projector driver 12d (not shown) for making the projector 17c the displaying process are integrated into the operating system 12a. The drivers 12b, 12c and 12d depend on the models of the display 17a, the color printer 17b and the projector 17c and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12d, and show the processed result as output on the display 17a, the color printer 17b or the projector 17c, which serve as image output devices.

In the present invention, though the image processing apparatus is realized as a computer system, the computer system is not necessarily required, and a system that applies the process required in the present invention to similar image data is possible. A system where an image processing system for performing the image processing of present invention is integrated in a digital still camera, and image data after the image processing are used for printing through a color printer is possible. For a color printer, which obtains image data and prints without a computer system, it is possible to constitute such that the image processing of present invention is automatically applied on image data obtained through a scanner, a digital still camera, modem or the like and printing is processed.

The present invention is naturally applicable to different apparatuses for handling image data such as a color facsimile apparatus, a color copy apparatus or a projector as well.

Image-processing Control Program

An image-processing control program according to the present invention is usually recorded in a form readable by the computer 12 on a recording medium such as a floppy disk and a CD-ROM for circulation. The program is read by a medium reading device (such as the CD-ROM drive 13c and the floppy disk drive 13a), and is installed on the hard disk 13b. The program is constituted such that the CPU then properly reads a desired program from the hard disk 13b so as to carry out desired processing. Note that the image-processing control program itself according to the present invention constitutes a part of the present applied invention.

Color Conversion Table Producing Device

The color conversion table producing device 20A shown in FIG. 1 produces a color conversion table capable of enhancing continuity of color conversion of image data when CMY image data are converted to CMYKcm image data. It should be noted that C denotes cyan; M, magenta; Y, yellow; K, black; c, light cyan; and m, light magenta.

In FIG. 1, the color conversion table producing device 20A is comprised of a cost calculating unit 20d, a color conversion table (LUT) smoothing unit 20e, a color conversion table (LUT) producing unit 20f, and a color conversion table (LUT) storing unit 20b. A detailed description will be given of processing in these respective components later.

A description will now be given of a color conversion table producing program executed by the color conversion table producing device 20A shown in FIG. 1 with reference to FIGS. 5 through 7.

Figure 5:
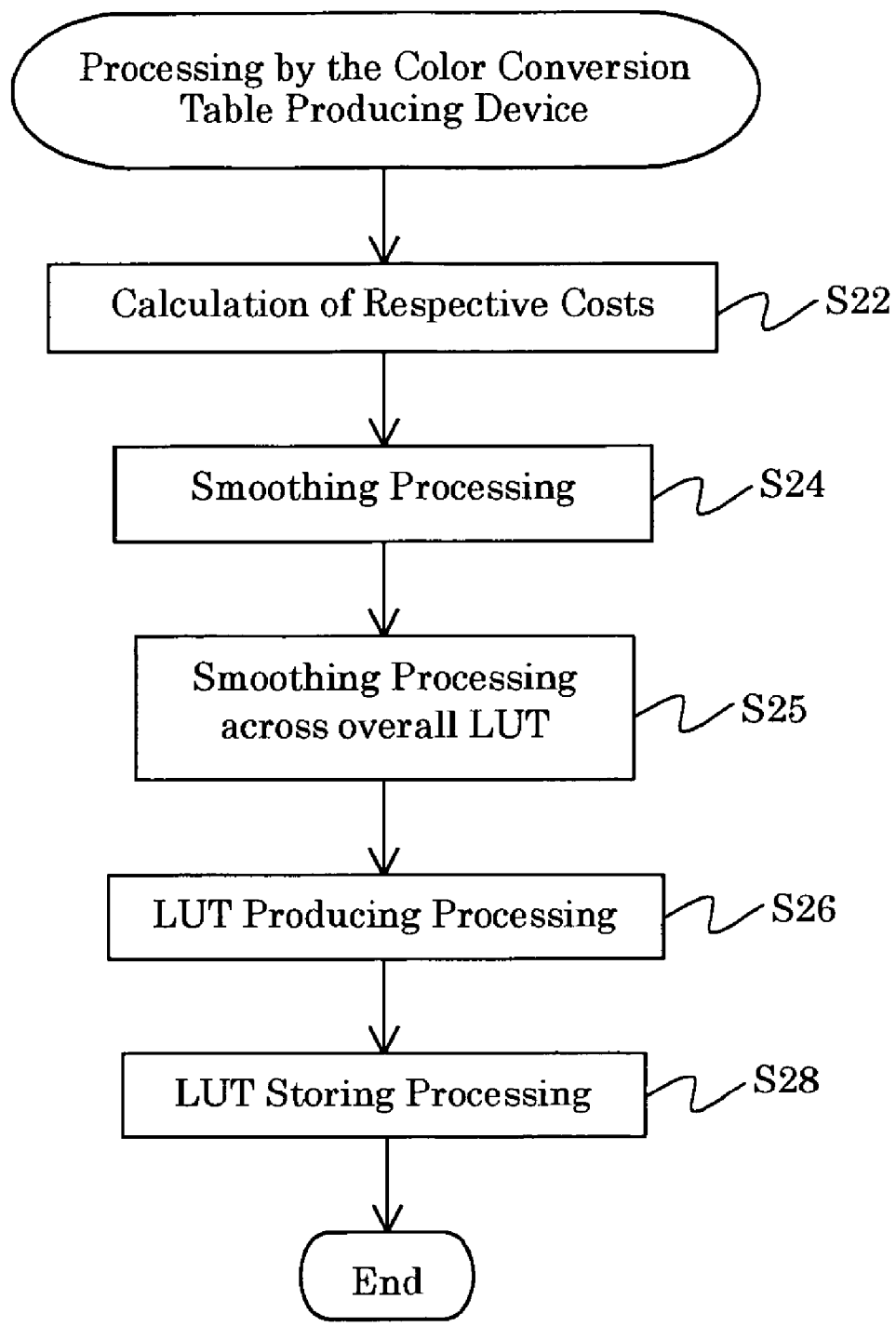
FIG. 5 is a flowchart describing the processing by the color conversion table producing device.

FIG. 5 shows a flowchart describing the processing by the color conversion table producing device which converts CMY image data to CMYKcm image data.

Calculation of Respective Costs (Step S22)

As FIG. 5 shows, first, the cost calculating unit 20d of the color conversion table producing device 20A calculates respective costs in a function (referred to as "evaluation function" hereinafter) E for evaluating a level of smoothing of data at respective lattice points (grid points) after the color conversion using the color conversion table (step S22). A detailed description will now be given of the evaluation function E.

(A-1-1) The evaluation function E is designed so as to have a smaller value if respective conditions are satisfied for a certain grid point on the LUT. For example, smoothing is applied to the ink quantities, the evaluation function is represented as a sum of cost terms designed based on the respective conditions:

$$E = Eit + Evt + Es + Ev + Ed + En + Eob + \quad (A\text{-}1\text{-}1)$$

where:

$E_{it}$ is a cost due to a twisted quantity of an ink-quantity vector,
$E_{vt}$ is a cost due to a twisted quantity in a virtual CMY space,
$E_s$ is a cost due to a deviation from target ink quantities,
$E_v$ is a cost due to a deviation from target virtual CMY,
$E_d$ is a cost due to violation of an ink quantity limitation,
$E_n$ is a cost due to an ink quantity reduced to minus, and
$E_{ob}$ is a cost relating to ink generation.

$E_{it}$ and $E_{vt}$ are costs relating to a twist between grid points neighboring each other, and it is possible to enhance continuity of image data after the color conversion by reducing these costs, thereby reducing the twist between the neighboring grid points caused by the conversion from CMY to CMYKcm. $E_s$ and $E_v$ are costs produced by differences between the ink-quantity vector before and after the smoothing, and related to a vector difference of the ink quantities caused by a chronological change at the same grid points. $E_d$, $E_n$, and $E_{ob}$ are costs of restraining excesses from the predetermined limitations.

A detailed description will now be given of the respective terms. It should be noted that it is not necessary to use all of the terms, and it is possible to select terms to be used if necessary. The equation (A-1-1) shows an example of smoothing the ink-quantity vector, and application to other vectors (vectors in Lab, XYZ, CMY, and other spaces) may be carried out in the same manner.

(A-1-2) General Forms of Respective Terms of Evaluation Function E

A cost term $E_c$ of the evaluation function relating to a certain vector X is represented by the following equation:

$$E_c = \begin{cases} W_1^t \cdot (M \cdot X - Y_T) \\ |W_2 \cdot (M \cdot X - Y_T)|^2 \end{cases} \quad (A\text{-}1\text{-}2)$$

where:

$E_c$ is a cost (scalar),
X is a column vector having X of elements,
M is a Y×X matrix used for converting the vector X to a vector Y=M·X, which is a vector having Y of elements subject to the cost,
$Y_T$ is a column vector having Y of elements,
$W_1$ is a column vector having Y of elements, and represents weights for the cost assigned to the respective elements of a vector Y–$Y_T$,
$W_2$ is a Y×Y diagonal matrix, and represents weights for the cost assigned to the respective elements of the vector Y–$Y_T$, and
"t" denotes transposition.

In the following description, a first equation and a second equation of the equation (A-1-2) are respectively referred to as a linear equation form and a quadratic equation form.

(A-1-3) Cost $E_{it}$ Due to Twisted Quantity of Ink-quantity Vector (Ink-quantity Vector Space)

A grid point neighboring a certain grid point "p" is denoted as $p_r$ (referred to as "reference grid point" hereinafter). A grid point other than the grid point $p_r$ neighboring the grid point "p" is denoted as $p_t$ (referred to as "transition grid point" hereinafter), and a grid point which has the same positional relationship with the grid point $p_t$ as that the grid point "p" has with the grid point $p_r$ is denoted as $p_{tr}$. It is assumed that the respective grid points "p", $p_r$, $p_t$, and $p_{tr}$ retain ink-quantity vectors $I_p$, $I_{pr}$, $I_{pt}$, and $I_{ptr}$.

Figure 7:
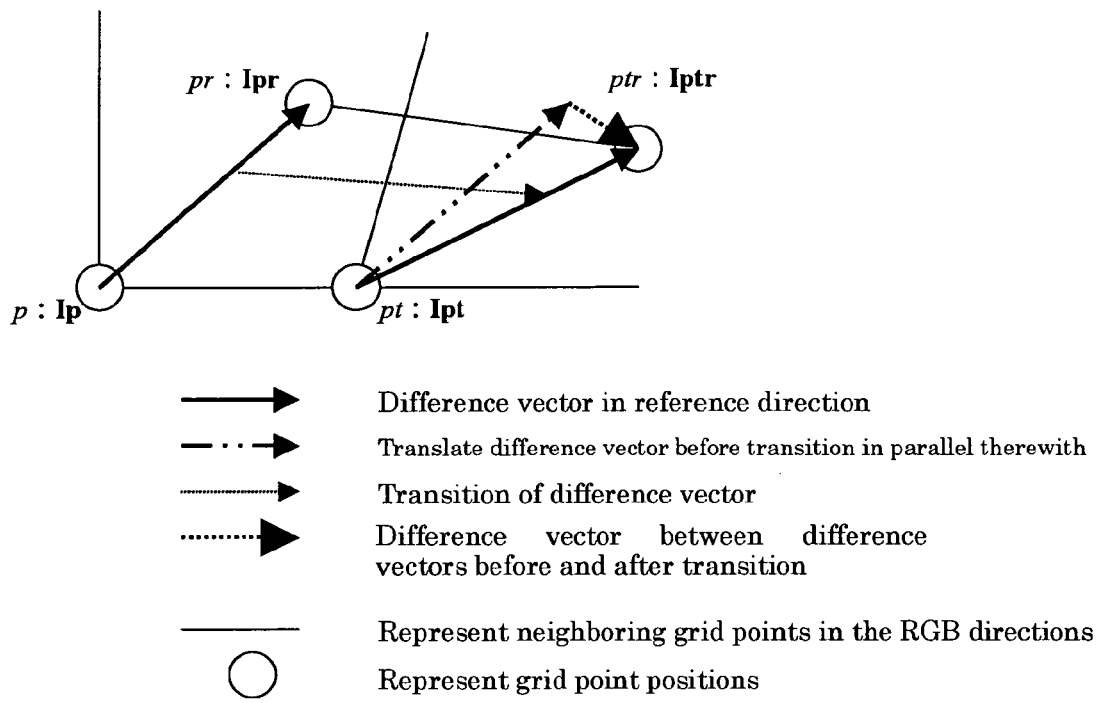
FIG. 7 describes a definition of a twisted quantity vector of ink quantities according to the first embodiment.

FIG. 7 shows a positional relationship of these grid points and the ink-quantity vectors retained by these grid points. In FIG. 7, if it is considered that a difference vector between $I_{pr}$ and $I_p$ is transitioned to a difference vector between $I_{ptr}$ and $I_{pt}$, a "displacement of the difference vector before and after the transition" is represented as a difference vector between these difference vectors. In addition, if a transition distance is considered as the magnitude of the difference vector between $I_{pt}$ and $I_p$, a "displacement of the difference vector before and after the transition per unit transition distance" is obtained by dividing the "displacement of the difference vector before and after the transition" by the transition distance. The twisted quantity of the ink-quantity vector at the grid point "p" is defined by adding the square of the magnitude of the "displacement of the difference vector before and after the transition per unit transition distance" for all of the grid points $p_r$ and $p_t$ neighboring the grid point "p". It should be noted that $p_r$ and $p_t$ may be the same grid point as long as they are neighboring "p".

This twisted quantity of the ink-quantity vector is represented as a cost in an equation (A-1-3):

$$E_{it} = \sum_{t=1}^{T} \sum_{r=1}^{R} \left| \frac{I_p + I_{p_{tr}} - I_{p_r} - I_{p_t}}{D_t} \right|^2 \quad (A\text{-}1\text{-}3)$$

In the equation (A-1-3),
"t" denotes a certain $p_t$,
T denotes the number of $p_t$,
"r" denotes a certain $p_r$,
R denotes the number of $p_r$, and
$D_t$ denotes a transition distance at "t".

The smaller the cost $E_{it}$ becomes, the more the twisted quantity of the ink quantities can be reduced.

Comparison of the equation (A-1-3) to the second equation of the equation (A-1-2) reveals that it is not necessary to convert the ink-quantity vector to a vector in other space, and thus, M is represented as a unit vector, and can be omitted. The respective elements are not multiplied by the weights, and thus, the $W_2$ is also a unit vector, and can be omitted. X corresponds to $I_p$, and $Y_T$ corresponds to $I_{ptr}\text{-}I_{pr}\text{-}I_{pt}$. $1/D_t^2$ is a constant for a certain "t", and thus, the equation (A-1-3) have the same form as the second equation of the equation (A-1-2).

(A-1-4) Cost $E_{vt}$ Due to Twisted Quantity in Virtual CMY Space

The conversion to the ink quantities are generally carried out from a three dimensional space such as the RGB or CMY space, and thus, if the twists are corrected only in the ink-quantity space, the conversion relationship between the original three-dimensional space such as the RGB or CMY space and the ink-quantity space having I dimensions may become non-linear. To minimize this collapse, it is considered that a preferable result is attained by simultaneously carrying out twisted-quantity correction in a three-dimensional space defined by a linear combination of the ink quantities with the correction in the ink-quantity space. In the following section is defined the cost $E_{vt}$ based on the twisted quantity in the tree-dimensional space defined by the linear combination of the ink quantities (referred to as virtual CMY hereinafter).

In exactly the same manner as the case of $E_{it}$, it is assumed that the respective grid points retain a virtual CMY vector. Based on this assumption, the virtual CMY vectors retained respectively at the grid points "p", $p_r$, $p_t$, and $p_{tr}$ are denoted as $V_p$, $V_{pr}$, $V_{pt}$, and $V_{ptr}$. The virtual CMY vector includes linearly combined elements of the ink-quantity vector using proper combination coefficients, and, by replacing I with V in the equation (A-1-3), and using a 3×I conversion matrix K ($V_p = K \cdot I_p$) from the ink-quantity vector to the virtual CMY vector, the cost $E_{vt}$ of the twisted quantity in the virtual CMY space is represented as an equation (A-1-4). It should be noted that I is the number of elements of the ink-quantity vector.

$$E_{vt} = \sum_{t=1}^{T} \sum_{r=1}^{R} \left| \frac{K \cdot I_p + V_{p_{tr}} - V_{p_r} - V_{p_t}}{D_{vt}} \right|^2 \quad (A\text{-}1\text{-}4)$$

where $D_{vt}$ denotes a transition distance at "t", and is the magnitude of a difference vector between virtual CMY vectors respectively at the grid points "p" and $p_t$.

Comparison of the equation (A-1-4) to the second equation of the equation (A-1-2) revels that both of them have the same form as in the case of the equation (A-1-3).

(A-1-5) Cost $E_s$ Due to Deviation from Target Ink Quantities

If it is assumed that an ink quantity vector $I_T$ is an ideal (target) vector, it can be considered that the larger a difference vector between the ink-quantity vector $I_p$ at the grid point "p" and the vector $I_T$ becomes, the more the cost increases. This cost is denoted as $E_s$, and is represented by an equation (A-1-5). It should be noted that $W_s$ is an I×I diagonal matrix, and is a weight matrix for the respective elements of the ink-quantity vector.

$$E_s = |W_s \cdot (I_p - I_T)|^2 \quad (A\text{-}1\text{-}5)$$

It can be confirmed that the equation (A-1-5) also has the same form as the second equation of the equation (A-1-2).

It is not realistic that the ideal ink-quantity vector $I_T$ is known in advance, and thus, an ink-quantity vector closer to the ideal state or an ink-quantity vector as another target may be employed.

(A-1-6) Cost $E_v$ Due to Deviation from Target Virtual CMY

On the assumption that a virtual CMY vector $V_T$ is ideal for the virtual CMY vector $V_p$ at the grid point "p", this cost $E_v$ is denoted as an equation (A-1-6) using the conversion matrix K in the same manner as the equation (A-1-5).

$$E_v = |W_v \cdot (K \cdot I_p - V_T)|^2 \quad (A\text{-}1\text{-}6)$$

where $W_v$ is a 3×3 diagonal matrix, and is a weight matrix for the respective elements of the virtual CMY vector. It can be confirmed that the equation (A-1-6) also has the same form as the second equation of the equation (A-1-2).

It is not realistic that an ideal virtual CMY vector $V_T$ is known in advance as in the case of $I_T$, and thus, a virtual CMY vector closer to the ideal state or a virtual CMY vector as another target may be employed.

(A-1-7) Cost $E_d$ Due to Violation of Ink Quantity Limitation

In terms of various combinations of the elements of the ink-quantity vector, there is such a cost relating to excesses of sums of these ink quantities from certain limits. If the ink quantities are excessive, inks spread, and cause an unfavorable result, and thus, this cost is evaluated.

On this occasion, it is assumed that a conversion matrix N from the ink-quantity vector $I_p$ to a vector representing the sums of the combinations of the ink quantities (referred to as combination vector hereinafter) $D_p$ ($D_p = N \cdot I_p$), and a vector $D_L$ contains these limits, and if respective elements of a difference vector between $D_p$ and $D_L$ are positive, it is assumed that costs are present. This situation is represented by an equation (A-1-7).

$$E_d = \begin{cases} W_{d1}^t \cdot (N \cdot I_p - D_L) \\ |W_{d2} \cdot (N \cdot I_p - D_L)|^2 \end{cases} \quad \text{(A-1-7)}$$

where $W_{d1}$ is a column vector having D of elements, $W_{d2}$ is a diagonal matrix having D×D of elements, and both are a weight vector and a weight matrix representing weights. The respective weight elements of $W_{d1}$ and $W_{d2}$ may be 0 according to negative/positive of the elements of the difference vector between $D_p$ and $D_L$. It should be noted that D is the number of the elements of the combination vector.

The equation (A-1-7) has a linear equation form and a quadratic equation form, and either of them is selected when used. The comparison of the equation (A-1-7) to the equation (A-1-2) reveals that both the linear equation form and the quadratic equation form are the same as those of the equation (A-1-2).

(A-1-8) Cost $E_n$ Due to Ink Quantity Reduced to Minus

It is assumed that if the respective elements of the ink-quantity vector $I_p$ are negative, the cost increases. This is represented by an equation (A-1-8).

$$E_n = \begin{cases} W_{n1}^t \cdot I_p \\ |W_{n2} \cdot I_p|^2 \end{cases} \quad \text{(A-1-8)}$$

where $W_{n1}$ denotes a weight vector having I of elements, and $W_{n2}$ is an I×I diagonal matrix, and is a weight matrix. The respective weight elements of $W_{n1}$ and $W_{n2}$ have a negative magnitude if the respective elements of the ink-quantity vector $I_p$ have a negative value.

The equation (A-1-8) also has a linear equation form and a quadratic equation form, and either of them is selected. The comparison of the equation (A-1-8) to the equation (A-1-2) reveals that both the linear equation form and the quadratic equation form are the same as those of the equation (A-1-2), though parts of both the forms can be omitted.

(A-1-9) Cost $E_{ob}$ Relating to Ink Generation

If certain elements of the ink-quantity vector $I_p$ should not retain positive values, this cost is produced if they do. If the generation of the inks is carried out earlier, visibility of dots increases, and thus, the graininess degrades, and therefore this cost is evaluated. This is represented by an equation (A-1-9):

$$E_{ob} = \begin{cases} W_{ob1}^t \cdot I_p \\ |W_{ob2} \cdot I_p|^2 \end{cases} \quad \text{(A-1-9)}$$

where $W_{ob1}$ denotes a weight vector having I of elements, and $W_{ob2}$ is an I×I diagonal matrix, and is a weight matrix. The respective weight elements of the $W_{ob1}$ and $W_{ob2}$ are positive if certain elements of the ink-quantity vector $I_p$ are positive, and simultaneously should not take a positive value.

The equation (A-1-9) also has a linear equation form and a quadratic equation form, and either of them is selected. It can also be confirmed that though both the linear equation form and the quadratic equation form include omitted parts, they are the same as those in the equation (A-1-2) based on the comparison of the equation (A-1-9) to the equation (A-1-2).

After the respective costs are calculated using the above (A-1-1) through (A-1-9), the following smoothing processing is carried out.

Smoothing Processing (Step S24)

As FIG. 5 shows, then, the color conversion LUT smoothing unit 20e of the color conversion table producing device 20A carries out the smoothing processing (calculation of $I_p$ which minimizes the evaluation function E) (step S24) detailed below.

(A-1-1) Outline of LUT Smoothing at Grid Point "p"

Smoothing of the LUT at the grid point "p" is carried out by minimizing the evaluation function E represented by the equation (A-1-1). Though an arbitrary method for minimizing the evaluation function E represented by the equation (A-1-1) may be used, the present embodiment employs the following method.

The respective terms in the equation (A-1-1) are represented as a sum of the equations (A-1-3) through (A-1-9). Namely, all of the terms of the evaluation function E include the respective elements of $I_p$, and are represented as high as the quadratic form in terms of these elements. Further, the quadratic form is the square of the linear form, and is always a downwardly convex function. Namely, the evaluation function E takes the minimum value for $I_p$ which equates function obtained by partially differentiating E by the respective elements of $I_p$ to a zero vector.

As described above, all of the equations (A-1-3) through (A-1-9) take the same form as the equation (A-1-2). Hereinafter, the equation (A-1-2) is used to show a general form of a case where the respective terms of the evaluation function E are partially differentiated by the respective elements of $I_p$ (X in the case of the equation (A-1-2)). An equation (A-1-10) shows a case where the equation (A-1-2) is partially differentiated by the respective elements of X.

$$A = \left( \frac{\partial E_c}{\partial X_1} \cdots \frac{\partial E_c}{\partial X_x} \cdots \frac{\partial E_c}{\partial X_X} \right)^t \quad \text{(A-1-10)}$$

$$= \begin{cases} (W_1^t \cdot M)^t \\ 2(W_2 \cdot M)^t \cdot W_2 \cdot (M \cdot X - Y_T) \end{cases}$$

where A denotes a column vector having X of elements, and the respective elements are obtained by partially differentiating $E_c$ by the respective elements $X_x$ of X. It should be noted that "x" is the element number of the vector X, and x=1, 2, ..., X.

(A-1-2) Partial Differentiation of Evaluation Function E by Elements of $I_p$

The following section shows partially differentiated equations (A-1-3) through (A-1-9) by the respective elements of $I_p$ as in the case of the equation (A-1-10). In the following equations, $A_{it}$, $A_{vt}$, $A_s$, $A_v$, $A_d$, $A_n$, and $A_{ob}$ denote column vectors of the element number of I respectively obtained by partially differentiating $E_{it}$, $E_{vt}$, $E_s$, $E_v$, $E_d$, $E_n$, and $E_{ob}$ by the respective elements $I_{pi}$ of $I_p$. It should be noted that "i" is the element number of the vector $I_p$, and i=1, 2, ..., I.

$$A_{it} = \left(\frac{\partial E_{it}}{\partial I_{p1}} \cdots \frac{\partial E_{it}}{\partial I_{pi}} \cdots \frac{\partial E_{it}}{\partial I_{pl}}\right)^t \quad \text{(A-1-12)}$$

$$= \sum_{t=1}^{T}\sum_{r=1}^{R} \frac{2}{D_t^2}(I_p + I_{p_{tr}} - I_{p_r} - I_{p_t})$$

$$A_{vt} = \left(\frac{\partial E_{vt}}{\partial I_{p1}} \cdots \frac{\partial E_{vt}}{\partial I_{pi}} \cdots \frac{\partial E_{vt}}{\partial I_{pl}}\right)^t \quad \text{(A-1-13)}$$

$$= \sum_{t=1}^{T}\sum_{r=1}^{R} \frac{2}{D_{vt}^2} K^t \cdot (K \cdot I_p + V_{p_{tr}} - V_{p_r} - V_{p_t})$$

$$A_s = \left(\frac{\partial E_s}{\partial I_{p1}} \cdots \frac{\partial E_s}{\partial I_{pi}} \cdots \frac{\partial E_s}{\partial I_{pl}}\right)^t \quad \text{(A-1-14)}$$

$$= 2W_s^2 \cdot (I_p - I_T)$$

$$A_v = \left(\frac{\partial E_v}{\partial I_{p1}} \cdots \frac{\partial E_v}{\partial I_{pi}} \cdots \frac{\partial E_v}{\partial I_{pl}}\right)^t \quad \text{(A-1-15)}$$

$$= 2(W_v \cdot K)^t \cdot W_v \cdot (K \cdot I_p - V_T)$$

$$A_d = \left(\frac{\partial E_d}{\partial I_{p1}} \cdots \frac{\partial E_d}{\partial I_{pi}} \cdots \frac{\partial E_d}{\partial I_{pl}}\right)^t \quad \text{(A-1-16)}$$

$$= \begin{cases} (W_{d1}^t \cdot N)^t \\ 2(W_{d2} \cdot N)^t \cdot W_{d2} \cdot (N \cdot I_p - D_L) \end{cases}$$

$$A_n = \left(\frac{\partial E_n}{\partial I_{p1}} \cdots \frac{\partial E_n}{\partial I_{pi}} \cdots \frac{\partial E_n}{\partial I_{pl}}\right)^t \quad \text{(A-1-17)}$$

$$= \begin{cases} W_{n1} \\ 2W_{n2}^2 \cdot I_p \end{cases}$$

$$A_{ob} = \left(\frac{\partial E_{ob}}{\partial I_{p1}} \cdots \frac{\partial E_{ob}}{\partial I_{pi}} \cdots \frac{\partial E_{ob}}{\partial I_{pl}}\right)^t \quad \text{(A-1-18)}$$

$$= \begin{cases} W_{ob1} \\ 2W_{ob2}^2 \cdot I_p \end{cases}$$

The sum of the equations (A-1-12) through (A-1-18) is a vector obtained by partially differentiating the evaluation function E by the respective elements of $I_p$. It is assumed that this vector is a zero vector, and this equation is solved for $I_p$, there can be obtained $I_p$ which minimizes E. Namely, it means to solve:

$$f(I_p) = A_{it} + A_{vt} + A_s + A_v + A_d + A_n + A_{ob} \quad \text{(A-1-19)}$$
$$= 0$$

for $I_p$. It should be noted that "f" denotes a vector obtained by partially differentiating E by the respective elements of $I_p$ represented in a function form, and "0" denotes a zero vector. Of respective terms on the right side of a first equation of the equation (A-1-19), there are used only terms corresponding to the terms selected in the evaluation function of the equation (A-1-1).

As described above, the color conversion LUT smoothing unit 20e obtains $I_p$ which minimizes the evaluation function E, and then, terminates the smoothing processing.

Smoothing Processing Across Overall LUT (Step S25)

As FIG. 5 shows, then, the color conversion LUT smoothing unit 20e of the color conversion table producing device 20A carries out smoothing processing across the entire LUT (step S25) detailed below.

For carrying out the smoothing processing across the entire LUT, if it is possible to correct only $I_p$ without changing the ink-quantity vectors retained on the grid points other than the grid point "p", it is possible to obtain an optimal $I_p$ in the method described above. However, in a more realistic case, it is actually necessary to correct the ink-quantity vectors retained on the grid points other than the grid point "p" for smoothing across the entire LUT. Therefore, the smoothing across the entire LUT is carried out by repeating sequential correction of the ink-quantity vectors at the respective grid points.

If the correction of the ink-quantity vector at the grid point "p" in a state "n" to a next state (solving the equation (A-1-19) for $I_p$) is denoted as "g", this correction is generally represented as an equation (A-1-20):

$$I_p^{n+1} = g(\ldots, I_{p-1}^n, I_p^n, I_{p+1}^n \ldots) \quad \text{(A-1-20)}$$

If the correction from the state "n" to the state "n+1" is carried out at all the grid points, the costs E at the respective grid points are not always reduced. As the equation (A-1-20) shows, the ink-quantity vectors in the state "n+1" are obtained for the respective grid points based on the cost E in the state "n", and thus, the cost E in the state "n+1" is not considered for obtaining the equation (A-1-20). Namely, though, due to the purpose of reducing the cost, it is expected that the cost in the state "n+1" is smaller than the cost in the state "n" at most of the grid points, it does not always hold true.

Therefore, (1) the correction is carried out at the entire grid points using the equation (A-1-20) (step S40), (2) the correction which increases the cost is not carried out (step S54), or (3) the correction by annealing which increases the cost by a certain degree of a small amount is permitted (step S56).

Then, with reference to a flowchart shown in FIG. 6, more detailed description will now be given of the smoothing processing across the entire LUT shown in the step S25 in FIG. 5.

Figure 6:
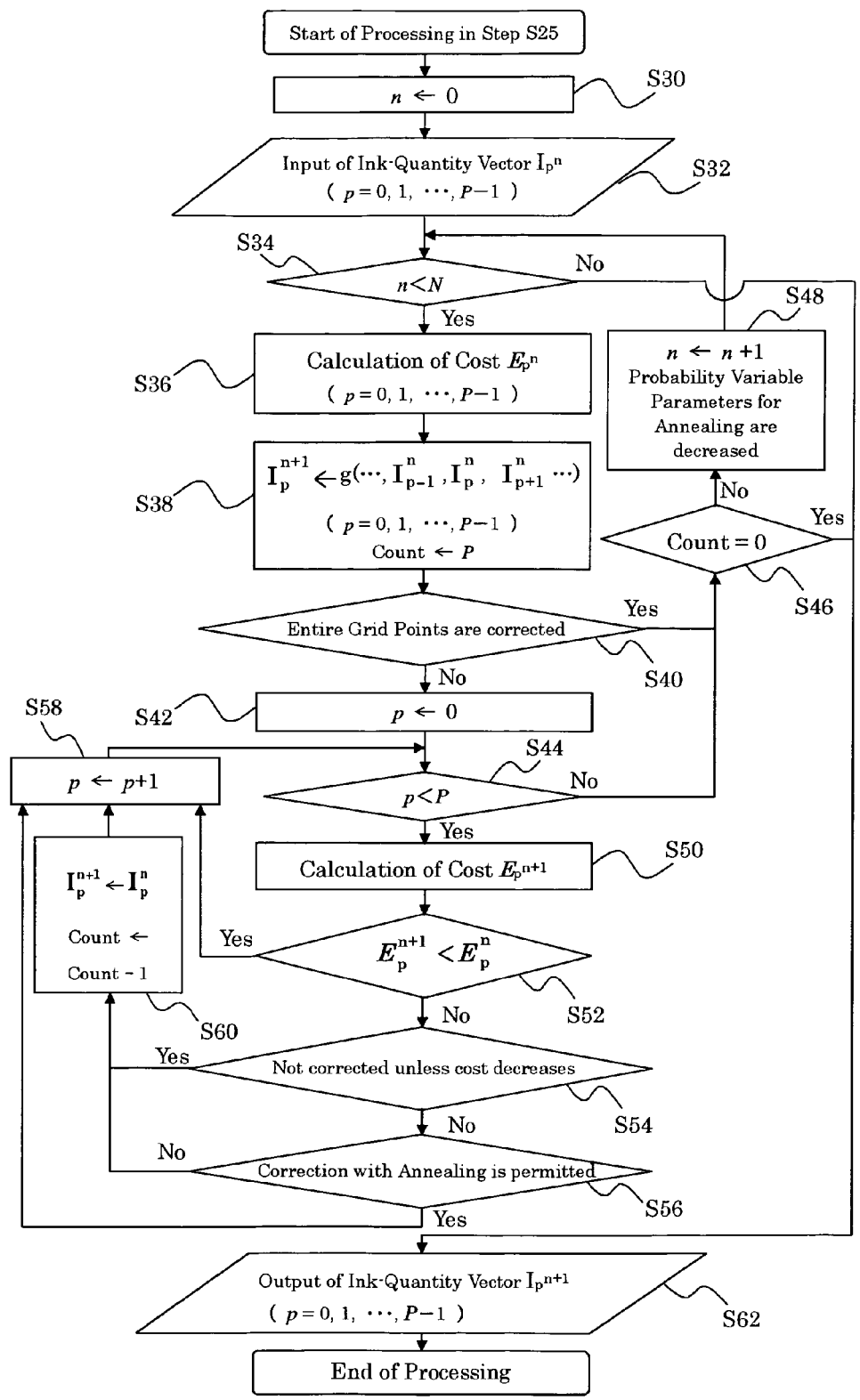
FIG. 6 is a flowchart describing the smoothing processing by the color conversion table according to the first embodiment.

As FIG. 6 shows, when the smoothing processing across the entire LUT starts in the step S25, 0 (zero) is set to "n" in the equation (A-1-20) (step S30), and the ink-quantity vectors I:

$$I_p^n$$

(p=0, 1, . . . , P−1) are input (step S32). Reference numeral P denotes the number of the grid points.

Then, it is determined whether "n<N" or not (step S34), and if "n<N" holds ("Yes" in the step S34), the costs at the respective grid point "p" in the state "n":

$$E_p^n$$

(p=0, 1, . . . , P−1) are calculated (step S36), the ink-quantity vectors in the certain state "n" at the respective grid point "p" (p=0, 1, . . . , P−1) are obtained using the equation (A-1-20), and a variable "Count" is set to P (step S38).

Reference numeral N denotes how many times the smoothing is carried out, and indicates that the maximum value of the state "n" is N−1.

If a condition "all of the grid points are not corrected" holds ("No" in the step S40), "p" is set to 0 (zero) (step S42), and it is determined whether "p<P" or not (step S44).

Alternatively, if a condition "all of the grid points are corrected" holds ("Yes" in the step S40), or "p<P" does not hold ("No" in the step S44), and "Count" is not 0 (zero) ("No" in a step S46), "n+1" is set to "n", and probability variable parameters for the annealing are decreased (step S48), and the procedure returns to the step S34.

Alternatively, if "p<P" holds ("Yes" in the step S44), the cost for the grid point "p" in the state "n+1":

$$E_p^{n+1}$$

is calculated (step S50), and it is determined whether:

$$E_p^{n+1} < E_p^n$$

or not (step S52). If the cost at the grid point "p" in the state "n+1" is equal to or more than the cost at the grid point "p" in the state "n" ("No" in a step S52), it is determined whether a condition "not corrected unless cost decreases" holds (step S54), and if the condition "not corrected unless cost decreases" does not hold in the step S34 ("No" in the step S54), it is determined whether a condition "correction with annealing is permitted" holds (step S56).

If the condition "not corrected unless cost decreases" holds ("Yes" in the step S54), or the condition "correction with annealing is not permitted" holds ("No" in the step S56), the ink-quantity vector at the grid point "p" in the state "n":

$$I_p^n$$

is set to the ink-quantity vector at the grid point "p" in the state "n+1":

$$I_p^{n+1}$$

and, simultaneously, the variable (Count−1) is set to "Count" (step S60).

Then, after the step S60, or if the cost at the grid point "p" in the state "n+1" is less than the cost at the grid point "p" in the state "n" ("Yes" in the step S52), or if the condition "correction with annealing is permitted" holds ("Yes" in the step S56), "p+1" is set to "p" (step S58), and the procedure returns to the step S44.

Alternatively, if "n<N" does not hold in the step S34 ("No" in the step S34), or "Count" is 0 in the step S46 ("Yes" in the step S46), the ink-quantity vectors:

$$I_p^{n+1}$$

(p=0, 1, . . . , P−1) are output (step S62), and the procedure terminates.

Then, after the smoothing processing across the entire LUT (step S25), the procedure returns to the step S26 in FIG. 5, the color conversion table is produced (step S26), and the produced color conversion table is stored in the color conversion LUT storing unit 20b (step S28).

The procedure described above can produce the color conversion table capable of enhancing the continuity of the color conversion of the image data.

Image Processing Device

In FIG. 3, the image processing device 20B applies desired image processing to RGB image input data, and outputs the processed image data to an image output device 30.

The image data are produced by separating a color image into respective predetermined element colors, and representing intensities in these respective element colors, which are chromatic colors, and may be mixed into achromatic colors typified by gray and black if they are mixed at predetermined ratios.

In the present embodiment, a description will be given of a case where the image output device is a color printer using inks in six colors: C (cyan), M (magenta), Y (yellow), K (black), c (light cyan), and m (light magenta), and reproducing colors based on the RGB data.

The image processing device 20B is comprised of a first color converting unit 20d which converts the RGB image data to CMY image data, a color conversion LUT storing unit 20b which stores at least the color conversion table produced by the color conversion table producing device 20A, and a second color converting unit 20a which reads a color conversion table (LUT) selected by a color conversion LUT selecting unit 20c from the color conversion LUT storing unit 20b, and refers to the read color conversion LUT thereby converting the CMY data to CMYKcm data.

A description will now be given of an operation of the image processing device 20B with reference to FIG. 4.

Figure 4:
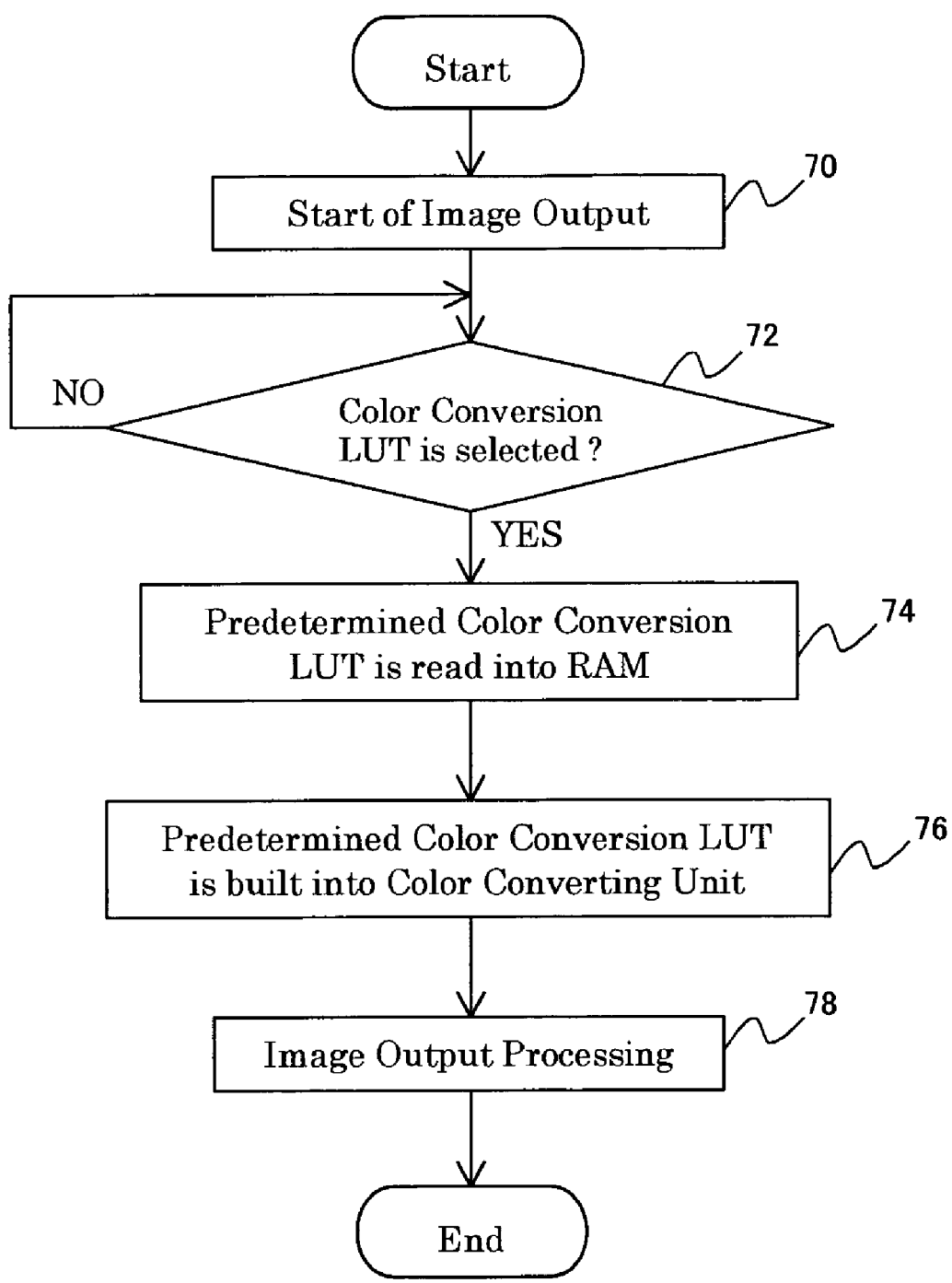
FIG. 4 is a flowchart for explaining an operation of the image processing device 20B.

As FIG. 4 shows, if the user instructs the image output start (step 70), and a predetermined color conversion LUT is selected ("Yes" in a step 72), the predetermined color conversion LUT is read from the color conversion LUT storing unit 20b, and read into a RAM (step 74). Then, the color conversion LUT is built into the second color converting unit 20a (step 76), the three-dimensional color conversion LUT is referred to carry out image processing using interpolation, and image output processing is carried out (step 78).

According to the image processing device of the present embodiment, if in the step 72 is selected a color conversion table which is produced by the color conversion table producing device 20A, and can enhance the continuity of the color conversion of the image data, the color conversion is carried out using the color conversion table, and thus, the tone jump after the color conversion can be prevented.

(A-2) Second Example

Using a smoothing level evaluation function used for evaluating a smoothing level at respective lattice point data after color conversion by a color conversion table in a perceptually uniform color space such as the Lab space.

Figure 8:
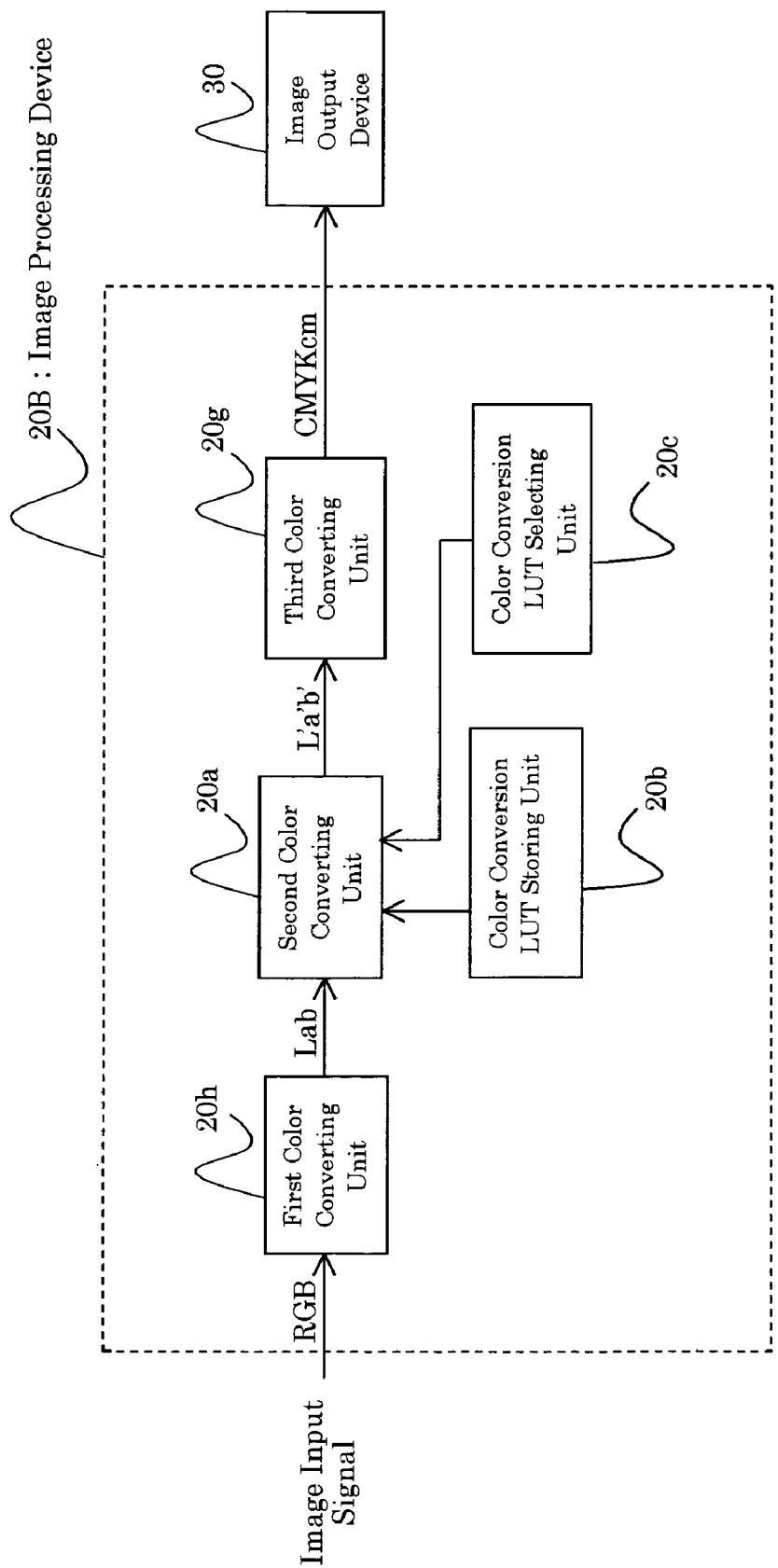
FIG. 8 is a function block diagram of an image processing apparatus according to an embodiment of the present invention.

A function block diagram of a color conversion table producing device according to a second example is the same as the block diagram of the first example shown in FIG. 1. FIG. 8 shows a function block diagram of an image processing device according to the second example.

Hardware Constitution

Specific hardware constitution examples of a color conversion table producing device and the image processing device according to the second example are the same as those shown in the schematic block diagram according to the first example in FIG. 2, and thus, a description will be omitted.

Image Processing Control Program

An image processing control program according to the present invention is usually recorded on a recording medium such as a floppy disk or a CD-ROM in a form readable by a computer 12, and circulated. The program is read by a media reader (such as a CD-ROM drive 13c and a floppy disk drive 13a), and then, installed on a hard disk 13b. There is such a constitution that a CPU then properly reads a desired program from the hard disk 13b, and carries out desired processing. It should be noted that the image processing control program according to the present invention itself constitutes a part of the invention of the present application.

In the second example, the color conversion table producing device 20A shown in FIG. 1 produces the color conversion table which converts the Lab image data converted from the RGB (sRGB) image data to L'a'b' image data adapted to a color space of an image output device. This color conversion table produce a color conversion table capable of enhancing continuity of the color conversion of the image data when the Lab image data is converted to the L'a'b' image data. In the present embodiment as an example of the color conversion in the perceptually uniform color space, a description will be given of color conversion in the Lab space.

As in the first example, the color conversion table producing device 20A according to the second example shown in FIG. 1 is comprised of a cost calculating unit 20d, a color conversion table (LUT) smoothing unit 20e, a color conversion table (LUT) producing unit 20f, and a color conversion table (LUT) storing unit 20b. A detailed description will be given of processing in these respective components later.

A description will now be given of a color conversion table producing program executed by the color conversion table producing device 20A shown in FIG. 1 with reference to FIGS. 5, 9, and 10.

Color conversion table producing processing carried out by the color conversion table producing device 20A according to the second example is the same as that presented in the flowchart describing the color conversion table producing processing by the color conversion table producing device 20A according to the first example shown in FIG. 5.

Calculation of Respective Costs (Step S22)

As FIG. 5 shows, first, the cost calculating unit 20d of the color conversion table producing device 20A calculates respective costs in a function (referred to as "evaluation function" hereinafter) E for evaluating a level of smoothing of data at respective lattice points (grid points) after the color conversion using the color conversion table (step S22). A detailed description will now be given of the evaluation function E.

(A-2-1) The evaluation function E is designed so as to have a smaller value if respective conditions are satisfied for a certain grid point in the LUT. If smoothing processing is applied to an Lab vector, the evaluation function E is represented as a sum of cost terms designed based on the respective conditions:

$$E = E_{lt} + E_l \quad (A\text{-}2\text{-}1)$$

where:

$E_{lt}$ is a cost due to a twisted quantity of an Lab vector, and
$E_l$ is a cost due to a deviation from target Lab.

The $E_{lt}$ is a cost relating to a twist between grid points neighboring each other, and it is possible to enhance the continuity of the image data after the color conversion by reducing $E_{lt}$, thereby reducing the twist between the neighboring grid points caused by the conversion from Lab to L'a'b'. $E_l$ is a cost produced by a difference between the Lab vectors before and after the smoothing, and relates to a difference of the Lab vectors caused by a chronological change of the same grid points.

A detailed description will now be given of the respective terms. The equation (A-2-1) shows an example of smoothing the Lab vector, and application to other vectors (for example, vectors in XYZ, CMY, and other spaces) may be carried out in the same manner.

(A-2-2) General Forms of Respective Terms of Evaluation Function E

A cost term $E_c$ of the evaluation function relating to a certain vector X is generally represented by the following equation:

$$E_c = \begin{cases} W_1^t \cdot (M \cdot X - Y_T) \\ |W_2 \cdot (M \cdot X - Y_T)|^2 \end{cases} \quad (A\text{-}2\text{-}2)$$

where:

$E_c$ is a cost (scalar),
X is a column vector having X of elements,
M is a Y×X matrix used for converting the vector X to a vector Y=M·X, which is a vector having Y of elements subject to the cost,
$Y_T$ is a column vector having Y of elements,
$W_1$ is a column vector having Y of elements, and represents weights for the cost assigned to the respective elements of a vector Y−$Y_T$,
$W_2$ is a Y×Y diagonal matrix, and represents weights for the cost assigned to the respective elements of the vector Y−$Y_T$, and
"t" denotes transposition.

In the following description, a first equation and a second equation of the equation (A-2-2) are respectively referred to as a linear equation form and a quadratic equation form.

(A-2-3) Cost $E_{lt}$ Due to Twisted Quantity of Lab Vector (Lab Vector Space)

A grid point neighboring a certain grid point "p" is denoted as $p_r$ (referred to as "reference grid point" hereinafter). A grid point other than the grid point $p_r$ neighboring the certain grid point "p" is denoted as $p_t$ (referred to as "transition grid point" hereinafter), and a grid point which has the same positional relationship with the grid point $p_t$ as that the grid point "p" has with the grid point $p_r$ is denoted as $p_{tr}$. It is assumed that the respective grid points "p", $p_r$, $p_t$, and $p_{tr}$ retain Lab vectors $L_p$, $L_{pr}$, $L_{pt}$, and $L_{ptr}$.

Figure 10:
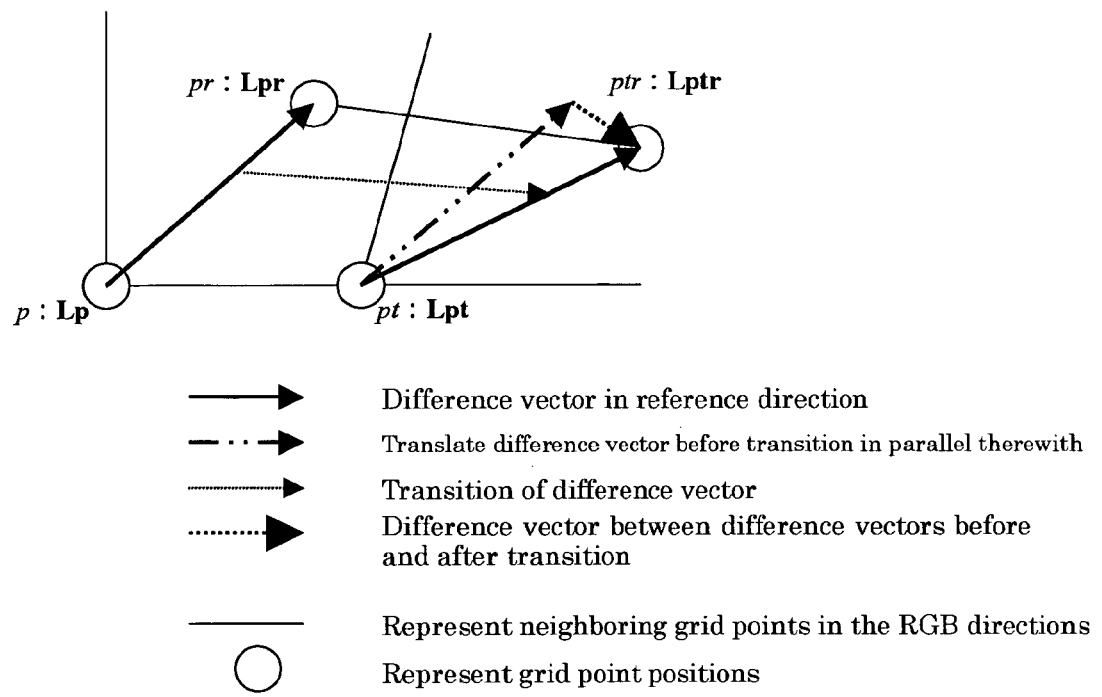
FIG. 10 describes a definition of an Lab vector according to the second embodiment.

FIG. 10 shows positional relationship of these grid points and the Lab vectors retained by these grid points. In FIG. 10, if it is considered that a difference vector between $L_{pr}$ and $L_p$ is transitioned to a difference vector between $L_{ptr}$ and $L_{pt}$, "a displacement of the difference vector before and after the transition" is represented as a difference vector between these difference vectors. In addition, if a transition distance is considered as the magnitude of the difference vector between $L_{pt}$ and $L_p$, a "displacement of the difference vector before and after the transition per unit transition distance" is obtained by dividing "displacement of the difference vector before and after the transition" by the transition distance. The twisted quantity of the Lab vector at the grid point "p" is defined by adding the square of the magnitude of the "displacement of the difference vector before and after the transition per unit transition distance" for all of the grid points $p_r$ and $p_t$ neighboring the grid point "p". It should be noted that $p_r$ and $p_t$ may be the same grid point as long as they are neighboring "p".

This twisted quantity of the Lab vector is represented as a cost in an equation (A-2-3):

$$E_{lt} = \sum_{t=1}^{T} \sum_{r=1}^{R} \left| \frac{L_p + L_{ptr} - L_{pr} - L_{pt}}{D_{lt}} \right|^2 \quad (A\text{-}2\text{-}3)$$

In the equation (A-2-3),
"t" denotes a certain $p_t$,
T denotes the number of $p_t$,
"r" denotes a certain $p_r$,
R denotes the number of $p_r$, and
$D_{lt}$ denotes a transition distance at "t".

The smaller the cost $E_{lt}$ becomes, the more the twisted quantity in the Lab space can be reduced.

Comparison of the equation (A-2-3) to the second equation of the equation (A-2-2) reveals that it is not necessary to convert the Lab vector to a vector in other space, and thus, M is represented as a unit vector, and can be omitted. The respective elements are not multiplied by the weights, and thus, the $W_2$ is also a unit vector, and can be omitted. X corresponds to $L_p$, and $Y_T$ corresponds to $L_{ptr}$-$L_{pr}$-$L_{pt}$. $1/D_{lt}^2$ is a constant for a certain "t", and thus, the equation (A-2-2) has the same form as the second equation of the equation (A-2-3).

(A-2-4) Cost $E_l$ Due to Deviation from Target Lab

If an Lab vector $L_T$ is an ideal (target) vector, it can be considered that the larger a difference between the Lab vector $L_p$ at the grid point "p" and the vector $L_T$ becomes, the more the cost increases. This cost is denoted as $E_l$, and is represented by an equation (A-2-4). It should be noted that $W_1$ is a 3×3 diagonal matrix, and is a weight matrix for the respective elements of the Lab vector.

$$E_l = |W_1 \cdot (L_p - L_T)|^2 \qquad (A\text{-}2\text{-}4)$$

It can be confirmed that the equation (A-2-4) also has the same form as the second equation of the equation (A-2-2).

It is not realistic that the ideal Lab vector $L_T$ is known in advance, and thus, an Lab vector closer to the ideal state or an Lab vector as another target may be employed. On this occasion, as the Lab vector closer to the ideal state, the Lab vector before the smoothing is used. This is because it is expected that as the smoothing progresses, the Lab vector at the grid point comes closer to the ideal value, and the restriction on time of the smoothing is also considered.

After the respective costs are calculated using the above (A-2-1), (A-2-3), and (A-2-4), the following smoothing processing is carried out.

Smoothing Processing (Step S24)

Figure 9:
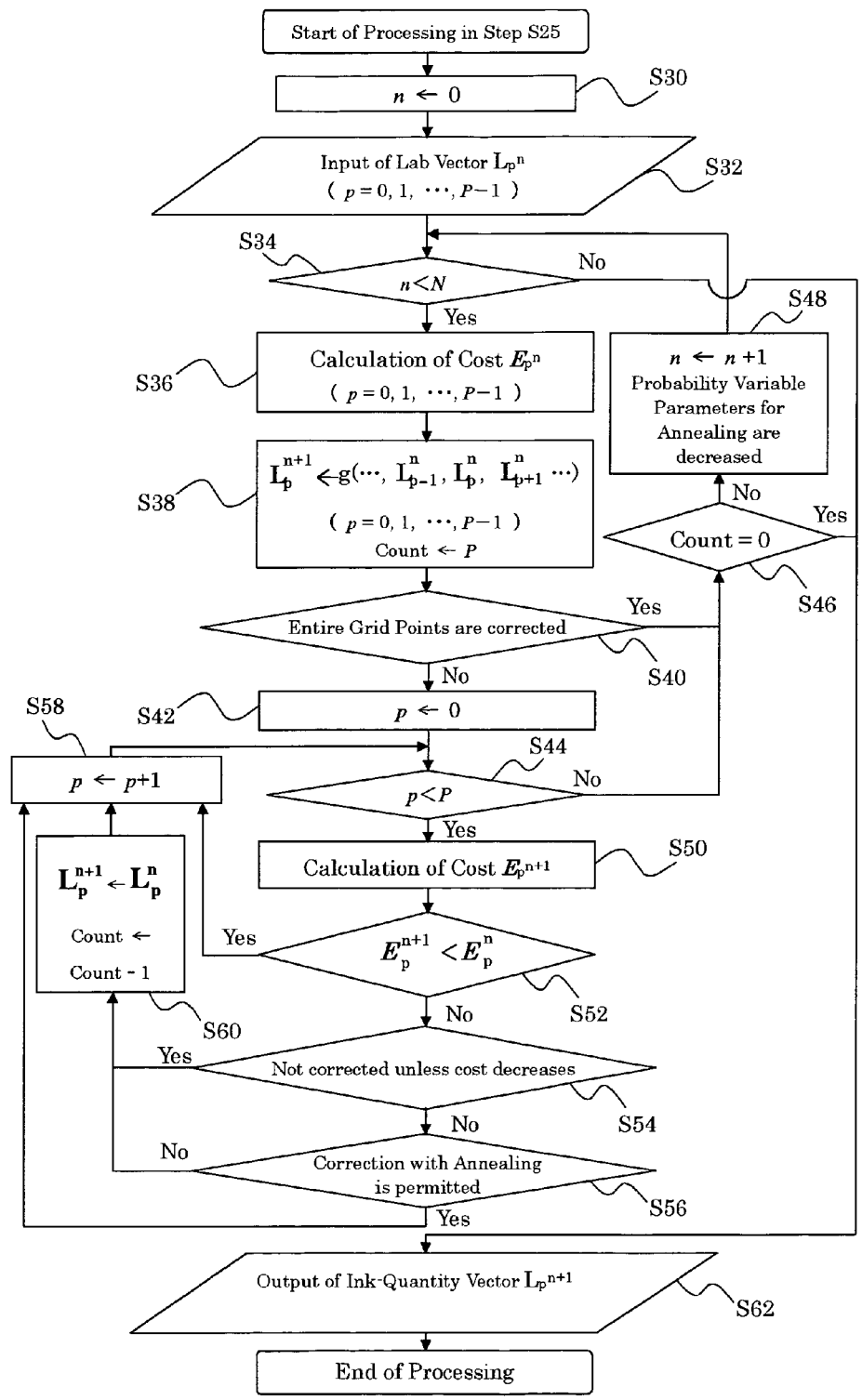
FIG. 9 is a flowchart describing the smoothing processing across the entire LUT by the color conversion table according to the second embodiment.

As FIG. 9 shows, then, the color conversion LUT smoothing unit 20e of the color conversion table producing device 20A carries out smoothing processing (calculation of $L_p$ which minimizes the evaluation function E) (step S24) detailed below.

(A-2-1) Outline of LUT Smoothing Processing at Grid Point "p"

Smoothing of the LUT at the grid point "p" is carried out by minimizing the evaluation function E represented by the equation (A-2-1). Though an arbitrary method for minimizing the evaluation function E represented by the equation (A-2-1) may be used, the present embodiment employs the following method.

The respective terms in the equation (A-2-1) are represented as a sum of the equations (A-2-3) and (A-2-4). Namely, all of the terms of the evaluation function E include the respective elements of the $L_p$, and are represented as high as the quadratic form in terms of these elements. Further, the quadratic form is the square of the linear form, and is always a downwardly convex function. Namely, the evaluation function E takes the minimum value for the $L_p$ which equates function obtained by partially differentiating E by the respective elements of $L_p$ to a zero vector.

As described above, both of the equations (A-2-3) and (A-2-4) take the same form as the equation (A-2-2). Hereinafter, the equation (A-2-2) is used to show a general form of partial differentiation of the respective terms of the evaluation function E by the respective elements of $L_p$ (X in the case of the equation (A-2-2)). An equation (A-2-5) shows a case where the equation (A-2-2) is partially differentiated by the respective elements of X.

$$A = \left( \frac{\partial E_c}{\partial X_1} \; \cdots \; \frac{\partial E_c}{\partial X_x} \; \cdots \; \frac{\partial E_c}{\partial X_X} \right)^t \qquad (A\text{-}2\text{-}5)$$

-continued
$$= \begin{cases} (W_1^t \cdot M)^t \\ 2(W_2 \cdot M)^t \cdot W_2 \cdot (M \cdot X - Y_T) \end{cases}$$

where A denotes a column vector having X of elements, and the respective elements are obtained by partially differentiating $E_c$ by the respective elements $X_x$ of X. It should be noted that "x" is the element number of the vector X, and x=1, 2, ..., X.

(A-2-2) Partial Differentiation of Evaluation Function E by Elements of $L_p$

The following section shows partially differentiated equations (A-2-3) and (A-2-4) by the respective elements of $L_p$ as in the case of the equation (A-2-5). In the following equations, $A_{lt}$ and $A_l$ denote column vectors having three elements respectively obtained by partially differentiating $E_{lt}$ and $E_l$ by the respective elements of $L_{pL}$, $L_{pa}$, and $L_{pb}$ of $L_p$.

$$A_{lt} = \left( \frac{\partial E_{lt}}{\partial L_{pL}} \; \frac{\partial E_{lt}}{\partial L_{pa}} \; \frac{\partial E_{lt}}{\partial L_{pb}} \right)^t \qquad (A\text{-}2\text{-}6)$$

$$= \sum_{t=1}^{T} \sum_{r=1}^{R} \frac{2}{D_{lt}^2} (L_p + L_{p_{tr}} - L_{p_r} - L_{p_t})$$

$$A_l = \left( \frac{\partial E_l}{\partial L_{pL}} \; \frac{\partial E_l}{\partial L_{p_a}} \; \frac{\partial E_l}{\partial L_{p_b}} \right)^t \qquad (A\text{-}2\text{-}7)$$

$$= 2W_1^2 \cdot (L_p - L_T)$$

The sum of the equations (A-2-6) and (A-2-7) is a vector obtained by partially differentiating the evaluation function E by the respective elements of $L_p$. If it is assumed that this vector is a zero vector, and this equation is solved for $L_p$, there can be obtained $L_p$ which minimizes E. Namely, it means to solve:

$$f(L_p) = A_{lt} + A_l \qquad (A\text{-}2\text{-}8)$$
$$= 0$$

for $L_p$. It should be noted that "f" is a vector obtained by partially differentiating E by the respective elements of $L_p$, and is represented in a function form, and "0" denotes a zero vector.

As described above, the color conversion LUT smoothing unit 20f obtains $L_p$ which minimizes the evaluation function E, and then, terminates the smoothing processing.

Smoothing Processing Across Overall LUT (Step S25)

As FIG. 5 shows, then, the color conversion LUT smoothing unit 20e of the color conversion table producing device 20A carries out smoothing processing across the entire color conversion LUT (step S25) detailed below.

For carrying out the smoothing processing across the entire LUT, if it is possible to correct only $L_p$ without changing the Lab vectors retained on the grid points other than the grid point "p", it is possible to obtain an optimal $L_p$ in the method described above. However, in a more realistic case, it is actually necessary to correct the Lab vectors retained on the grid points other than the grid point "p" for smoothing processing across the entire color conversion LUT. Therefore, the smoothing across the entire color conversion LUT is carried out by repeating sequential correction of the Lab vectors at the respective grid points.

If the correction of the Lab vector at the grid point "p" in a state "n" to a next state (solving the equation (A-2-8) for $L_p$) is denoted as "g", this correction is generally represented as an equation (A-2-9):

$$L_p^{n+1} = g(\ldots, L_{p-1}^n, L_p^n, L_{p+1}^n \ldots) \qquad (A\text{-}2\text{-}9)$$

If the correction from the state "n" to the state "n+1" is carried out at all the grid points, the costs E at the respective grid points are not always reduced. As the equation (A-2-9) shows, the Lab vectors in the state "n+1" are obtained for the respective grid points based on the cost E in the state "n", and thus, the cost E in the state "n+1" is not considered for obtaining the equation (A-2-9). Namely, though, due to the purpose of reducing the cost, it is expected that the cost in the state "n+1" is smaller than the cost in the state "n" at most of the grid points, it does not always hold true.

Therefore, (1) the correction is carried out at the entire grid points using the equation (A-2-9) (step S40), (2) correction which increases the cost is not carried out (step S54), or (3) correction by annealing which increases the cost by a certain degree of a small amount is permitted (step S56).

Then, with reference to a flowchart shown in FIG. 5, more detailed description will now be given of the smoothing processing across the entire color conversion LUT shown in S25 in FIG. 5.

As FIG. 5 shows, when the smoothing processing across the entire color conversion LUT starts in S25, 0 (zero) is set to "n" in the equation (A-2-9) (step S30), and the Lab vectors:

$$L_p^n$$

(p=0, 1, ..., P−1) are input (step S32). Reference numeral P denotes the number of the grid points.

Then, it is determined whether "n<N" or not (step S34), and if "n<N" holds ("Yes" in the step S34), the costs at grid point "p" in the state "n":

$$E_p^n$$

(p=0, 1, ..., P−1) are calculated (step S36), the Lab vectors in the certain state "n" at the respective grid point "p" (p=0, 1, ..., P−1) are obtained using the equation (A-2-10), and a variable "Count" is set to P (step S38).

Reference numeral N denotes how many times the smoothing is carried out, and indicates that the maximum value of the state "n" is N−1.

If a condition "all of the grid points are not corrected" holds ("No" in the step S40), "p" is set to 0 (zero) (step S42), and it is determined whether "p<P" or not (step S44).

Alternatively, if a condition "all of the grid points are corrected" holds ("Yes" in the step S40), or "p<P" does not hold ("No" in the step S44), and "Count" is not 0 (zero) ("No" in a step S46), "n+1" is set to "n", and probability variable parameters for the annealing are decreased (step S48), and the procedure returns to the step S34.

Alternatively, if "p<P" holds ("Yes" in the step S44), the cost for the grid point "p" in the state "n+1":

$$E_p^{n+1}$$

is calculated (step S50), and it is determined whether:

$$E_p^{n+1} < E_p^n$$

or not (step S52). If the cost at the grid point "p" in the state "n+1" is equal to or more than the cost at the grid point "p" in the state "n" ("No" in a step S52), it is determined whether a condition "not corrected unless cost decreases" holds (step S54), and if the condition "not corrected unless cost decreases" does not hold ("No" in the step S54), it is determined whether a condition "correction with annealing is permitted" holds (step S56).

If the condition "not corrected unless cost decreases" holds ("Yes" in the step S54), or the condition "correction with annealing is not permitted" holds ("No" in the step S56), the Lab vector at the grid point "p" in the state "n":

$$L_p^n$$

is set to the Lab vector at the grid point "p" in the state "n+1":

$$L_p^{n+1}$$

and, simultaneously, the variable (Count−1) is set to "Count" (step S60).

Then, after the step S60, or if the cost at the grid point "p" in the state "n+1" is less than the cost at the grid point "p" in the state "n" ("Yes" in the step S52), or the condition "correction with annealing is permitted" holds ("Yes" in the step S56), (p+1) is set to "p" (step S58), and the procedure returns to the step S44.

Alternatively, if "n<N" does not hold in the step S34 ("No" in the step S34), or "Count" is 0 ("Yes" in the step S46), the Lab vector:

$$L_p^{n+1}$$

(p=0, 1, ..., P−1) are output (step S62), and the procedure terminates.

Then, after the smoothing processing across the entire LUT (step S25), the procedure returns to the step S26 in FIG. 5, the color conversion table is produced (step S26), and the produced color conversion table is stored in the color conversion LUT storing unit 20b (step S28).

The procedure described above can produce the color conversion table capable of enhancing the continuity of the color conversion of the image data.

Image Processing Device

In FIG. 8, the image processing device 20B applies desired image processing to RGB image data, and outputs the processed image data to an image output device 30.

The image data are produced by separating a color image into predetermined element colors, and representing intensities in these respective element colors, which are chromatic colors, and may be mixed into achromatic colors typified by gray and black if they are mixed at predetermined ratios.

In the present embodiment, a description will be given of a case where the image output device is a color printer using inks in six colors: C (cyan), M (magenta), Y (yellow), K (black), c (light cyan), and m (light magenta), and reproducing colors based on the RGB data.

The image processing device 20B is comprised of a first color converting unit 20h which converts the RGB image data to Lab image data, a color conversion LUT storing unit 20b which stores at least the color conversion table produced by the color conversion table producing device 20A, a second color converting unit 20a which reads a color conversion table (LUT) selected by a color conversion LUT selecting unit 20c from the color conversion LUT storing unit 20b, refers to the read color conversion LUT thereby converting the Lab image data to L'a'b' image data, and a third color converting unit 20g which converts the L'a'b' image data to CMYKcm image data.

A description will now be given of an operation of the image processing device 20B with reference to FIG. 4.

As FIG. 4 shows, if the user instructs the image output start (step 70), and a predetermined color conversion LUT is selected through the color conversion LUT selecting unit 20c ("Yes" in a step 72), the predetermined color conversion LUT is read from the color conversion LUT storing unit 20b, and read into a RAM (step 74). Then, the color conversion LUT is built into the second color converting unit 20a (step 76), the three-dimensional color conversion LUT is referred to carry out image processing using interpolation, and image output processing is carried out (step 78).

According to the image processing device 20B according to the present embodiment, if in the step 72 is selected a color conversion table which is produced by the color conversion table producing device 20A, and can enhance the continuity of the color conversion of the image data, the color conversion is carried out using the color conversion table, and thus, the tone jump after the color conversion can be prevented.

(A-3) Third Example

Figure 19:
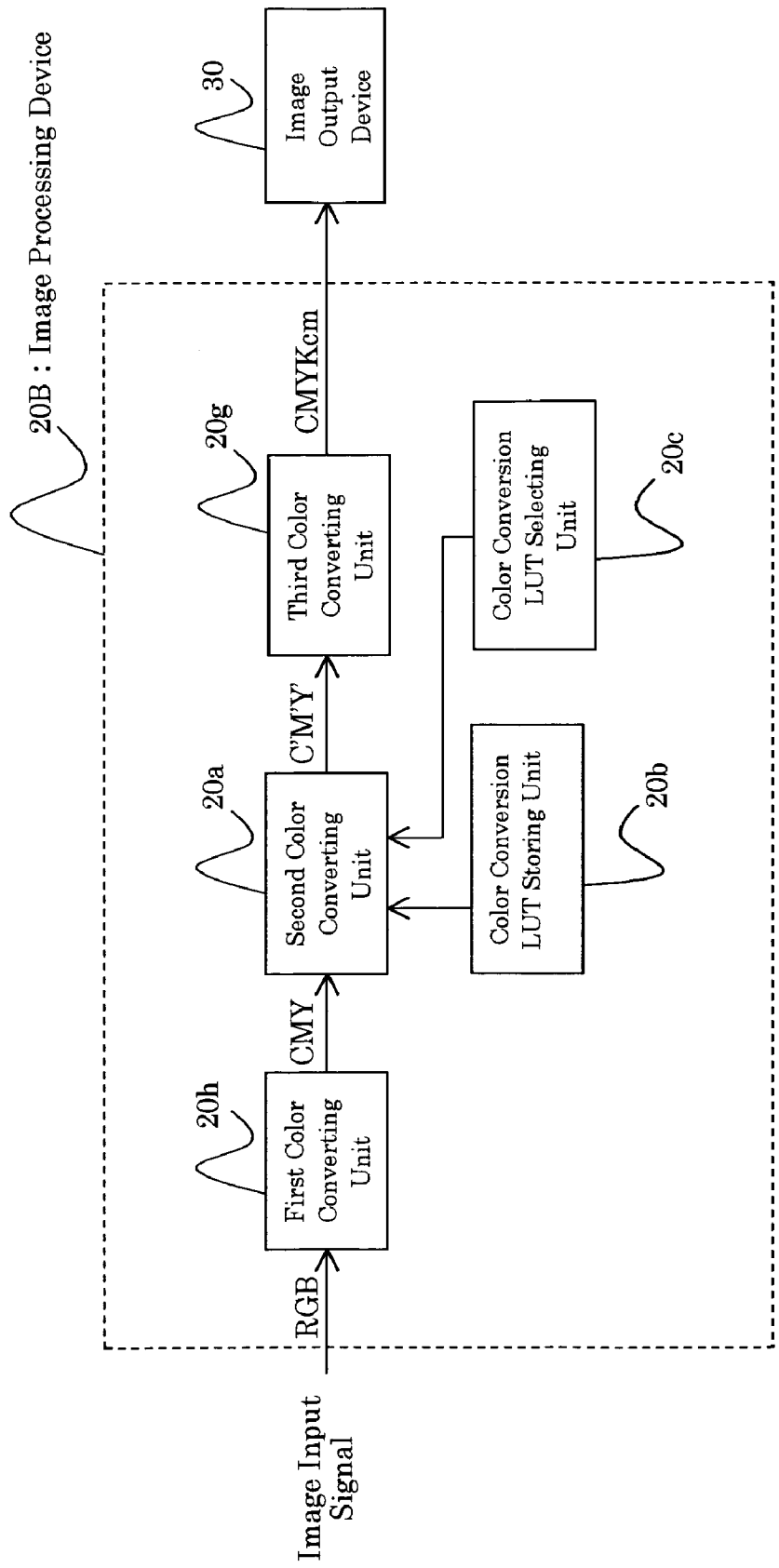
FIG. 19 shows a function block diagram of an image processing device according to an embodiment of the present invention.

Using a smoothing level evaluation function used for evaluating a smoothing level at respective lattice point data after the color conversion by a color conversion table in a color space such as the CMY space A function block diagram of a color conversion table producing device according to a third example is the same as the function block diagram of the first and second examples shown in FIG. 1. FIG. 19 shows a function block diagram of an image processing device according to the third example.

Hardware Constitution

Specific hardware constitution examples of a color conversion table producing device and the image processing device according to the third example are the same as those shown in the schematic block diagram according to the first and second examples in FIG. 2, and thus, a description will be omitted.

Image Processing Control Program

An image processing control program according to the present invention is usually recorded on a recording medium such as a floppy disk or a CD-ROM in a form readable by a computer 12, and circulated. The program is read by a media reader (such as a CD-ROM drive 13c and a floppy disk drive 13a), and then, is installed on a hard disk 13b. There is such a constitution that a CPU then properly reads a desired program from the hard disk 13b, and carries out desired processing. It should be noted that the image processing control program according to the present invention itself constitutes a part of the invention of the present application.

The color conversion table producing device 20A shown in FIG. 1 produces the color conversion table which converts CMY data represented as complements of RGB (sRGB) image data to C'M'Y image data adapted to a color space of an image output device. This color conversion table produces a color conversion table capable of enhancing continuity of the color conversion of the image data when the CMY image data is converted to C'M'Y image data. In the present embodiment as an example of the color conversion, a description will be given of the color conversion in the CMY space.

In FIG. 1, the color conversion table producing device 20A is comprised of a cost calculating unit 20d, a color conversion table (LUT) smoothing unit 20e, a color conversion table (LUT) producing unit 20f, and a color conversion table (LUT) storing unit 20b. A detailed description will be given of processing in these respective components later.

A description will now be given of a color conversion table producing program executed by the color conversion table producing device 20A shown in FIG. 1 with reference to FIGS. 5 through 12.

FIG. 5 shows a flowchart describing color conversion table producing processing by the color conversion table producing device 20A.

Calculation of Respective Costs (Step S22)

As FIG. 5 shows, first, the cost calculating unit 20d of the color conversion table producing device 20A calculates respective costs in a function (referred to as "evaluation function" hereinafter) E for evaluating a level of smoothing of data at respective lattice points (grid points) after the color conversion using the color conversion table (step S22). A detailed description will now be given of the evaluation function E.

(A-3-1) The evaluation function E is designed so as to have a smaller value if respective conditions are satisfied for a certain grid point in the LUT. If smoothing processing is applied to a CMY vector, the evaluation function E is represented as a sum of cost terms designed based on the respective conditions:

$$E = E_{vt} + E_v + E_d + E_n \quad (A\text{-}3\text{-}1)$$

where:

$E_{vt}$ is a cost due to a twisted quantity of a CMY vector, $E_v$ is a cost due to a deviation from target CMY, $E_d$ is a cost due to an excess of the CMY value from 255, and $E_n$ is a cost due to a CMY value reduced to minus.

The $E_{vt}$ is a cost relating to a twist between grid points neighboring each other, and it is possible to enhance the continuity of the image data after the color conversion by reducing $E_{vt}$, thereby reducing the twist between the neighboring grid points caused by the conversion from CMY to C'M'Y'. $E_v$ is a cost produced by a difference between the CMY vectors before and after the smoothing, and related to the differences of the CMY vectors caused by a chronological change of the same grid points. $E_d$ and $E_n$ are costs produced if the CMY value does not fall within a range from 0 to 255 when the CMY value is normalized to that range.

A detailed description will now be given of the respective terms. The equation (A-3-1) shows an example of smoothing the CMY vector, and application to other vectors (vectors in XYZ, Lab, and other spaces) may be carried out in the same manner.

(A-3-2) General Forms of Respective Terms of Evaluation Function E

A cost term $E_c$ of the evaluation function relating to a certain vector X is represented by the following equation:

$$E_c = \begin{cases} W_1^t \cdot (M \cdot X - Y_T) \\ |W_2 \cdot (M \cdot X - Y_T)|^2 \end{cases} \quad (A\text{-}3\text{-}2)$$

where:

$E_c$ is a cost (scalar),

X is a column vector having X of elements,

M is a Y×X matrix used for converting the vector X to a vector Y=M·X, which is a vector having Y of elements subject to the cost, $Y_T$ is a column vector having Y of elements, $W_1$ is a column vector having Y of elements, and represents weights for the cost assigned to the respective elements of a vector $Y-Y_T$, $W_2$ is a Y×Y diagonal matrix, and represents weights for the cost assigned to the respective elements of the vector $Y-Y_T$, and "t" denotes transposition.

In the following description, a first equation and a second equation of the equation (A-3-2) are respectively referred to as a linear equation form and a quadratic equation form.

(A-3-3) Cost $E_{vt}$ Due to Twisted Quantity of CMY Vector (CMY Vector Space)

A grid point neighboring a certain grid point "p" is denoted as $p_r$ (referred to as "reference grid point" hereinafter). A grid point other than the grid point $p_r$ neighboring the certain grid point "p" is denoted as $p_t$ (referred to as "transition grid point" hereinafter), and a grid point which has the same positional relationship with the grid point $p_t$ as that the grid point "p" has with the grid point $p_r$ is denoted as $p_{tr}$. It is assumed that the respective grid points "p", $p_r$, $p_t$, and $p_{tr}$ retain CMY vectors $V_p$, $V_{pr}$, $V_{pt}$, and $V_{ptr}$.

Figure 12:
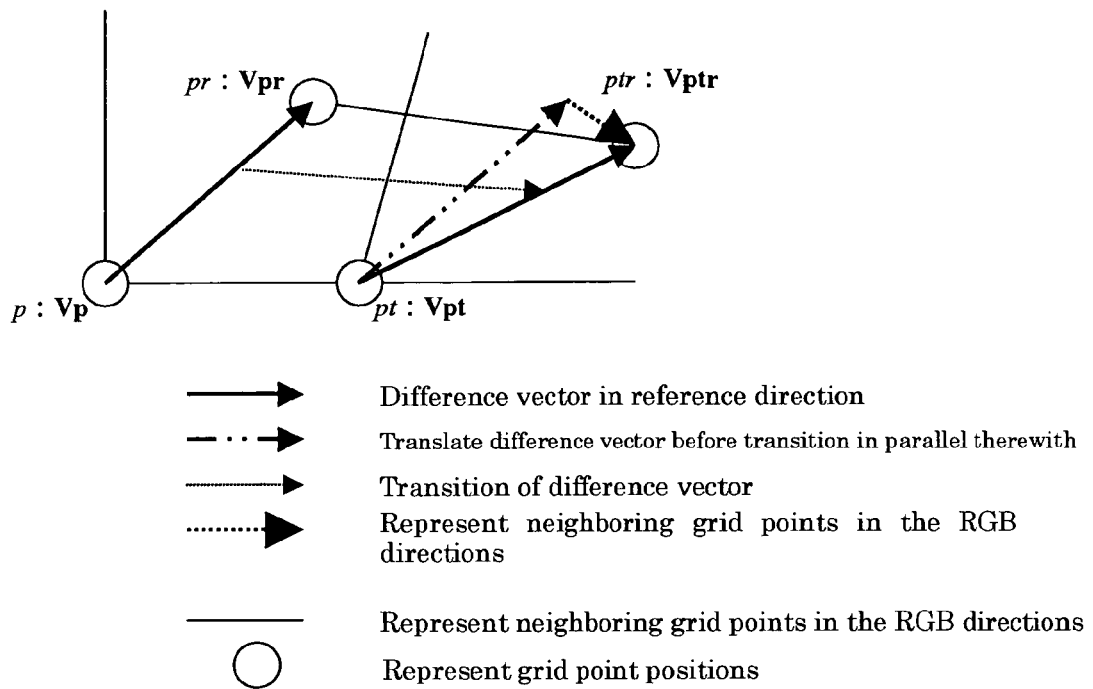
FIG. 12 describes a definition of CMY vectors according to the third embodiment.

FIG. 12 shows positional relationship of these grid points and the CMY vectors retained by these grid points. In FIG. 12, if it is considered that a difference vector between $V_{pr}$ and $V_p$ is transitioned to a difference vector between $V_{ptr}$ and $V_{pt}$, "a displacement of the difference vectors before and after the transition" is represented as a difference vector between these difference vectors. In addition, if a transition distance is considered as the magnitude of the difference vector between $V_{pt}$ and $V_p$, a "displacement of the difference vector before and after the transition per unit transition distance" is obtained by dividing "displacement of the difference vector before and after the transition" by the transition distance. The twisted quantity of the CMY vector at the grid point "p" is defined by adding the square of the magnitude of the "displacement of the difference vector before and after the transition per unit transition distance" for all of the grid points $p_r$ and $p_t$ neighboring the grid point "p". It should be noted that $p_r$ and $p_t$ may be the same grid point as long as they are neighboring "p".

This twisted quantity of the CMY vector is represented as a cost in an equation (A-3-3).

$$E_{vt} = \sum_{t=1}^{T} \sum_{r=1}^{R} \left| \frac{V_p + V_{ptr} - V_{pr} - V_{pt}}{D_{vt}} \right|^2 \quad \text{(A-3-3)}$$

In the equation (A-3-3),
"t" denotes a certain $p_t$,
T denotes the number of $p_t$,
"r" denotes a certain $p_r$,
R denotes the number of $p_r$, and
$D_{vt}$ denotes a transition distance at "t".

The smaller the cost $E_{vt}$ is, the more the twisted quantity in the CMY space can be reduced.

Comparison of the equation (A-3-3) to the quadratic equation form of the equation (A-3-2) reveals that it is not necessary to convert the CMY vector to a vector in other space, and thus, M is represented as a unit vector, and can be omitted. The respective elements are not multiplied by the weights, and thus, the $W_2$ is also a unit vector, and can be omitted. X corresponds to $V_p$, and $Y_T$ corresponds to $V_{ptr}$-$V_{pr}$-$V_{pt}$. $1/D_{vt}^2$ is a constant for a certain "t", and thus, the equation (A-3-3) has the same form as the quadratic equation form of the equation (A-3-2).

(A-3-4) Cost $E_v$ Due to Deviation from Target CMY

It is assumed that a CMY vector $V_T$ is an ideal (target) vector, it can be considered that the larger a difference between the CMY vector $V_p$ at the grid point "p" and the vector $V_T$ becomes, the more the cost increases. This cost is denoted as $E_v$, and is represented by an equation (A-3-4). It should be noted that $W_v$ is a 3×3 diagonal matrix, and is a weight matrix for the respective elements of the CMY vector.

$$E_v = |W_v \cdot (V_p - V_T)|^2 \quad \text{(A-3-4)}$$

It can be confirmed that the equation (A-3-4) also has the same form as the quadratic equation form of the equation (A-3-2).

It is not realistic that the ideal CMY vector $V_T$ is known in advance, and thus, a CMY vector closer to the ideal state or a CMY vector as another target may be employed. On this occasion, as the CMY vector closer to the ideal state, the CMY vector before smoothing is used. This is because it is expected that as the smoothing progresses, the CMY vector at the grid point comes closer to the ideal value, and the restriction on time of the smoothing is also considered.

(A-3-5) Cost Due to Excess of CMY Value from 255

If the CMY value is normalized to 0 to 255, and the elements of the CMY vector $V_p$ at the grid point "p" exceed 255, the larger the excesses of them become, the larger the cost becomes. This cost is denoted as $E_d$, and is represented by an equation (A-3-5). In this equation, $V_L$ is a column vector having three elements which have a limit value 255, $W_{d1}$ is a weight column vector having three elements, and $W_{d2}$ is a 3×3 weight diagonal matrix. The respective weight elements of $W_{d1}$ and $W_{d2}$ are zero if $V_p$-$V_L$ is 0 or less, and take a positive value if $V_p$-$V_L$ is positive.

$$E_d = \begin{cases} W_{d1}^t \cdot (V_p - V_L) \\ |W_{d2} \cdot (V_p - V_L)|^2 \end{cases} \quad \text{(A-3-5)}$$

The equation (A-3-5) has a linear equation form and a quadratic equation form, and they may be properly selected for use. It can be confirmed that both the linear equation form and the quadratic equation form of the equation (A-3-5) have the same form as those of the equation (A-3-2) based on the comparison of these equations.

(A-3-6) Cost Due to CMY Value Less than Zero

As is the case with $E_d$, if the CMY value is normalized to 0 to 255, and the elements of the CMY vector $V_p$ take negative values, the larger the excesses of the negative values become, the larger the cost becomes. This cost is denoted as $E_n$, and is represented by an equation (A-3-6). In this equation, $W_{n1}$ is a weight column vector having three elements, and $W_{n2}$ is a 3×3 weight diagonal matrix. The respective weight elements of $W_{n1}$ and $W_{n2}$ are negative if $V_p$ is negative, and are zero if $V_p$ is 0 or more.

$$E_n = \begin{cases} W_{n1}^t \cdot V_p \\ |W_{n2} \cdot V_p|^2 \end{cases} \quad \text{(A-3-6)}$$

The equation (A-3-6) also has a linear equation form and a quadratic equation form, and they may be properly selected for use. It can be confirmed that both the linear equation form and the quadratic equation form of the equation (A-3-6) have the same form as those of the equation (A-3-2) based on the comparison of these equations.

After the respective costs are calculated using the above (A-3-1), (A-3-3), (A-3-4), (A-3-5), and (A-3-6), the following smoothing processing is carried out.

Smoothing Processing (Step S24)

Figure 11:
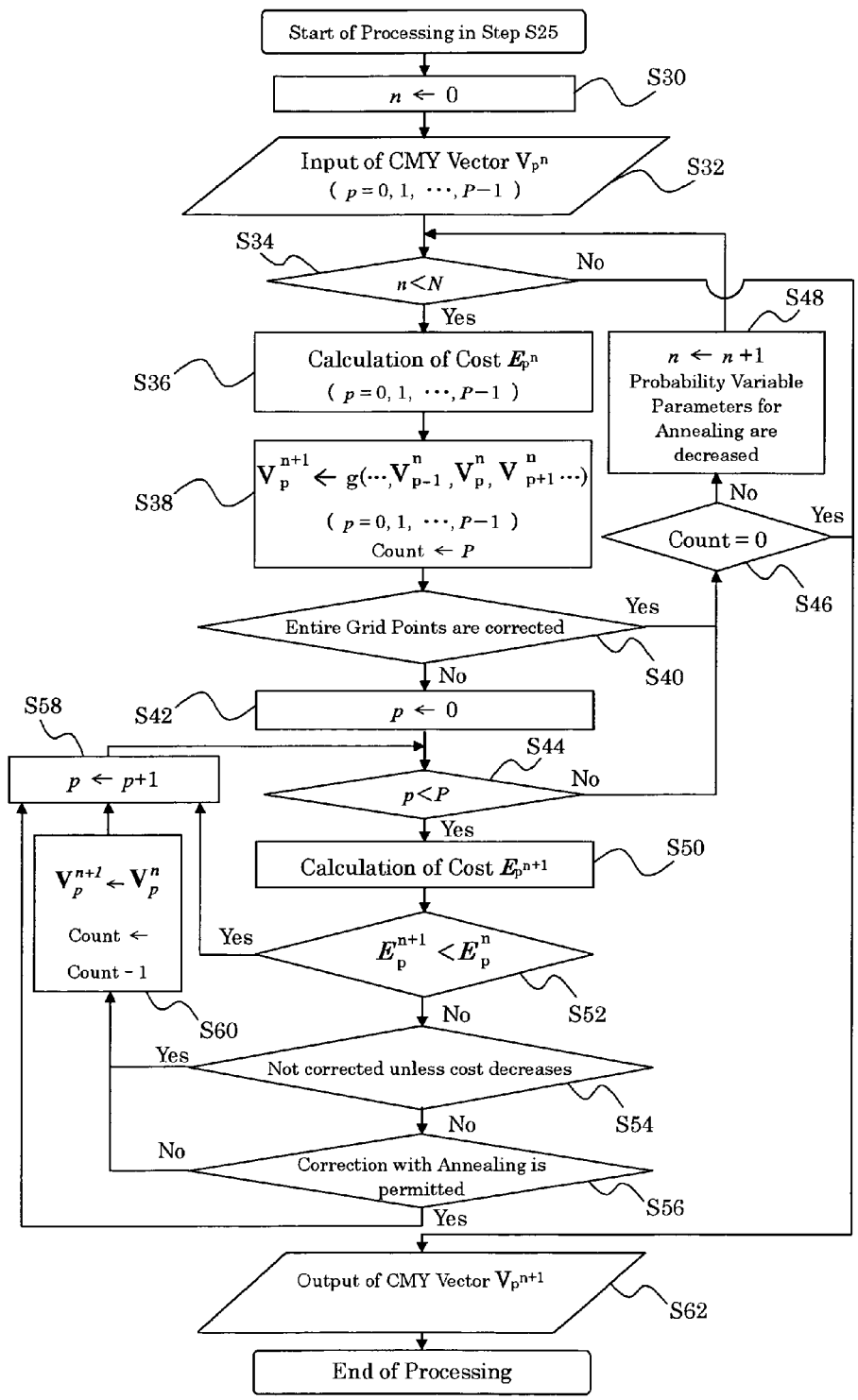
FIG. 11 is a flowchart describing the smoothing processing across the entire LUT by the color conversion table according to the third embodiment.

As FIG. 11 shows, then, the color conversion LUT smoothing unit 20e of the color conversion table producing device 20A carries out smoothing processing (calculation of $V_p$ which minimize the evaluation function E) (step S24) detailed below.

(A-3-1) Outline of LUT Smoothing at Grid Point "p"

Smoothing of the LUT at the grid point "p" is carried out by minimizing the evaluation function E represented by the equation (A-3-1). Though an arbitrary method for minimizing the evaluation function E represented by the equation (A-3-1) may be used, the present embodiment employs the following method.

The respective terms in the equation (A-3-1) are represented as a sum of the equations (A-3-3) through (A-3-6). Namely, all of the terms of the evaluation function E include the respective elements of the $V_p$, and are represented as high as the quadratic form in terms of these elements. Further, the quadratic form is the square of the linear form, and is always a downwardly convex function. Namely, the evaluation function E takes the minimum value for the $V_p$ which equates function obtained by partially differentiating E by the respective elements of $V_p$ to a zero vector.

As described above, all of the equations (A-3-3) through (A-3-6) take the same form as the equation (A-3-2). Hereinafter, the equation (A-3-2) is used to show a general form of partial differentiation of the respective terms of the evaluation function E by the respective elements of $V_p$ (X in the case of the equation (A-3-2)). An equation (A-3-7) shows a case where the equation (A-3-2) is partially differentiated by the respective elements of X.

$$A = \left(\frac{\partial E_c}{\partial X_1} \cdots \frac{\partial E_c}{\partial X_x} \cdots \frac{\partial E_c}{\partial X_X}\right)^t \quad (A\text{-}3\text{-}7)$$

$$= \begin{cases} (W_1^t \cdot M)^t \\ 2(W_2 \cdot M)^t \cdot W_2 \cdot (M \cdot X - Y_T) \end{cases}$$

where A denotes a column vector having X of elements, and the respective elements are obtained by partially differentiating $E_c$ by the respective elements $X_x$ of X. It should be noted that "x" is the element number of the vector X, and x=1, 2, ..., X.

(A-3-2) Partial Differentiation of Evaluation Function E by Elements of $V_p$

The following section shows partially differentiated equations (A-3-3) through (A-3-6) by the respective elements of $V_p$ as in the case of the equation (A-3-7). In the following equation, $A_{vt}$, $A_v$, $A_d$, and $A_n$ denote column vectors having three elements respectively obtained by partially differentiating $E_{vt}$, $E_v$, $E_d$, and $E_n$ by the respective elements of $C_p$, $M_p$, and $Y_p$ of $V_p$.

$$A_{vt} = \left(\frac{\partial E_{vt}}{\partial C_p} \quad \frac{\partial E_{vt}}{\partial M_p} \quad \frac{\partial E_{vt}}{\partial Y_p}\right)^t \quad (A\text{-}3\text{-}8)$$

$$= \sum_{t=1}^{T} \sum_{r=1}^{R} \frac{2}{D_{vt}^2}(V_p + V_{p_{tr}} - V_{p_r} - V_{p_t})$$

$$A_v = \left(\frac{\partial E_v}{\partial C_p} \quad \frac{\partial E_v}{\partial M_p} \quad \frac{\partial E_v}{\partial Y_p}\right)^t \quad (A\text{-}3\text{-}9)$$

$$= 2W_v^2 \cdot (V_p - V_T)$$

-continued $$A_d = \left(\frac{\partial E_d}{\partial C_p} \quad \frac{\partial E_d}{\partial M_p} \quad \frac{\partial E_d}{\partial Y_p}\right)^t \quad (A\text{-}3\text{-}10)$$

$$= \begin{cases} W_{dt} \\ 2W_{d2}^2 \cdot (V_p - V_L) \end{cases}$$

$$A_n = \left(\frac{\partial E_n}{\partial C_p} \quad \frac{\partial E_n}{\partial M_p} \quad \frac{\partial E_n}{\partial Y_p}\right)^t \quad (A\text{-}3\text{-}11)$$

$$= \begin{cases} W_{nt} \\ 2W_{n2}^2 \cdot W_p \end{cases}$$

The sum of the equations (A-3-8) through (A-3-11) is a vector obtained by partially differentiating the evaluation function E by the respective elements of $V_p$. If this vector is a zero vector, and this equation is solved for $V_p$, there can be obtained $V_p$ which minimizes E. Namely, it means to solve:

$$f(V_p) = A_{vt} + A_v + A_d + A_n \quad (A\text{-}3\text{-}12)$$

$$= 0$$

for $V_p$. It should be noted that "f" is a vector obtained by partially differentiating E by the respective elements of $V_p$, and is represented in a function form, and "0" denotes a zero vector.

As described above, the color conversion LUT smoothing unit 20f obtains $V_p$ which minimizes the evaluation function E, and then, terminates the smoothing processing.

Smoothing Processing Across Overall LUT (Step S25)

As FIG. 5 shows, then, the color conversion LUT smoothing unit 20e of the color conversion table producing device 20A carries out smoothing processing across the entire color conversion LUT (step S25) detailed below.

For carrying out the smoothing processing across the entire LUT, if it is possible to correct only $V_p$ without changing the CMY vectors retained on the grid points other than the grid point "p", it is possible to obtain an optimal $V_p$ in the method described above. However, in a more realistic case, it is actually necessary to correct the CMY vectors retained on the grid points other than the grid point "p" for smoothing across the entire color conversion LUT. Therefore, the smoothing across the entire color conversion LUT is carried out by repeating sequential correction of the CMY vectors at the respective grid points.

If the correction of the CMY vector at the grid point "p" in a state "n" to a next state (solving the equation (A-3-12) for $V_p$) is denoted as "g", this correction is generally represented as an equation (A-3-13).

$$V_p^{n+1} = g(\ldots, V_{p-1}^n, V_p^n, V_{p+1}^n \ldots) \quad (A\text{-}3\text{-}13)$$

If the correction from the state "n" to the state "n+1" is carried out at all the grid points, the costs E at the respective grid points are not always reduced. As the equation (A-3-13) shows, the CMY vectors in the state "n+1" are obtained for the respective grid points based on the cost E in the state "n", and thus, the cost E in the state "n+1" is not considered for obtaining the equation (A-3-13). Namely, though, due to the purpose of reducing the cost, it is expected that the cost in the state "n+1" is smaller than the cost in the state "n" at most of the grid points, it does not always hold true.

Therefore, (1) the correction is carried out at the entire grid points using the equation (A-3-13) (step S40), (2) the correction which increases the cost is not carried out (step S54), or (3) the correction by annealing which increases the cost by a certain degree of a small amount is permitted (step S56).

Then, with reference to a flowchart shown in FIG. 11, more detailed description will now be given of the smoothing processing across the entire color conversion LUT shown in step S25 in FIG. 5.

As FIG. 11 shows, when the smoothing processing across the entire color conversion LUT starts in S25, 0 (zero) is set to "n" in the equation (A-3-13) (step S30), and the CMY vectors:

$$V_p^n$$

(p=0, 1, ..., P−1) are input (step S32). Reference numeral P denotes the number of the grid points.

Then it is determined whether "n<N" or not (step S34), and if "n<N" holds ("Yes" in the step S34), the costs at grid point "p" in the state "n":

$$E_p^n$$

(p=0, 1, ..., P−1) are calculated (step S36), the CMY vectors in the certain state "n" at the respective grid point "p" (p=0, 1, ..., P−1) are obtained using the equation (A-3-13), and a variable "Count" is set to P (step S38).

Reference numeral N denotes how many times the smoothing is carried out, and indicates that the maximum value of the state "n" is N−1.

If a condition "all of the grid points are not corrected" holds ("No" in the step S40), "p" is set to 0 (zero) (step S42), and it is determined whether "p<P" or not (step S44).

Alternatively, if a condition "all of the grid points are corrected" holds ("Yes" in the step S40), or "p<P" does not hold ("No" in the step S44), and "Count" is not 0 (zero) ("No" in a step S46), "n+1" is set to "n", and probability variable parameters for the annealing are decreased (step S48), and the procedure returns to the step S34.

Alternatively, if "p<P" holds ("Yes" in the step S44), the cost for the grid point "p" in the state "n+1":

$$E_p^{n+1}$$

is calculated (step S50), and it is determined whether:

$$E_p^{n+1} < E_p^n$$

or not (step S52). If the cost at the grid point "p" in the state "n+1" is equal to or more than the cost at the grid point "p" in the state "n" ("No" in the step S52), it is determined whether a condition "not corrected unless cost decreases" holds (step S54), and if the condition "not corrected unless cost decreases" does not hold ("No" in the step S54), it is determined whether a condition "correction with annealing is permitted" holds (step S56).

If the condition "not corrected unless cost decreases" holds ("Yes" in the step S54), or the condition "correction with annealing is not permitted" holds ("No" in the step S56), the CMY vector at the grid point "p" in the state "n":

$$V_p^n$$

is set to the CMY vector at the grid point "p" in the state "n+1":

$$V_p^{n+1}$$

and, simultaneously, the variable (Count−1) is set to "Count" (step S60).

Then, after the step S60, or if the cost at the grid point "p" in the state "n+1" is less than the cost at the grid point "p" in the state "n" ("Yes" in the step S52), or the condition "correction with annealing is permitted" holds ("Yes" in the step S56), (p+1) is set to "p" (step S58), and the procedure returns to the step S44.

Alternatively, if "n<N" does not hold in the step S34 ("No" in the step S34), or "Count" is 0 in the step S46 ("Yes" in the step S46), the CMY vector:

$$V_p^{n+1}$$

(p=0, 1, ..., P−1) are output (step S62), and the procedure terminates.

Then, after the smoothing processing across the entire LUT (step S25), the procedure returns to the step S26 in FIG. 5, the color conversion table is produced (step S26), and the produced color conversion table is stored in the color conversion LUT storing unit 20b (step S28).

The procedure described above can produce the color conversion table capable of enhancing the continuity of the color conversion of the image data.

Image Processing Device

In FIG. 19, the image processing device 20B applies desired image processing to RGB image data, and outputs the processed image data to an image output device 30.

The image data are produced by separating a color image into predetermined element colors, and representing intensities in these respective element colors, which are chromatic colors, and may be mixed into achromatic colors typified by gray and black if they are mixed at predetermined ratios.

In the present embodiment, a description will be given of a case where the image output device is a color printer using inks in six colors: C (cyan), M (magenta), Y (yellow), K (black), c (light cyan), and m (light magenta), and reproducing colors based on the RGB data.

The image processing device 20B is comprised of a first color converting unit 20h which converts the RGB image data to CMY image data, a color conversion LUT storing unit 20b which stores at least the color conversion table produced by the color conversion table producing device 20A, a second color converting unit 20a which reads a color conversion table (LUT) selected by a color conversion LUT selecting unit 20c from the color conversion LUT storing unit 20b, refers to the read color conversion LUT thereby converting the CMY image data to C'M'Y' image data, and a third color converting unit 20g which converts the C'M'Y' image data to CMYKcm image data.

A description will now be given of an operation of the image processing device 20B with reference to FIG. 4.

As FIG. 4 shows, if the user instructs the image output start (step 70), and a predetermined color conversion LUT is selected through the color conversion LUT selecting unit 20c ("Yes" in a step 72), the predetermined color conversion LUT is read from the color conversion LUT storing unit 20b, and read into the RAM (step 74). Then, the color conversion LUT is built into the second color converting unit 20a (step 76), the three-dimensional color conversion LUT is referred to carry out image processing using interpolation, and image output processing is carried out (step 78).

According to the image processing device 20B according to the present embodiment, if in the step 72 is selected a color conversion table which is produced by the color conversion table producing device 20A, and can enhance the continuity of the color conversion of the image data, the color conversion is carried out using the color conversion table, and thus, the tone jump is prevented after the color conversion.

(B) Second Embodiment (Chroma Maintenance Processing)

If simple smoothing is applied to the table to solve the discontinuity in the lattice, the chroma may decrease across the entire table. A description will now be given of a chroma maintenance processing for producing a color conversion table which restrains the color twist and the tone jump as much as possible while maintaining the chroma.

The chroma maintenance processing is carried out in "(A-1-6) Cost $E_v$ due to deviation from target virtual CMY". As described in (A-1-6), it is considered that the virtual CMY vector $V_p$ at the grid point "p" takes the virtual CMY vector $V_T$ as an ideal vector, this cost $E_v$ is denoted by the equation (A-1-6) using the conversion matrix K.

It should be noted that $W_v$ is a 3×3 diagonal matrix, and is a weight matrix for the respective elements of the virtual CMY vector. It can be confirmed that the equation (A-1-6) also has the same form as the second equation of the equation (A-1-2).

It is not realistic that an ideal virtual CMY vector $V_T$ is known in advance as in the case of $I_T$, and thus, a virtual CMY vector closer to an ideal state or a virtual CMY vector as another target may be employed. On this occasion, as the virtual CMY vector closer to the ideal state, the virtual CMY vector before smoothing is used. This is because it is expected that as the smoothing progresses, the virtual CMY vector comes closer to the smoother ideal virtual CMY vector, and the restriction on time of the smoothing is also considered.

However, the smoothing may decrease the chroma represented by the color data at grid points. If the chroma decreases, vividness of an image decreases, and thus, the colors are not reproduced faithfully. Therefore, it is desirable that the chroma of the color data before and the after the smoothing is maintained approximately constant.

Figure 13:
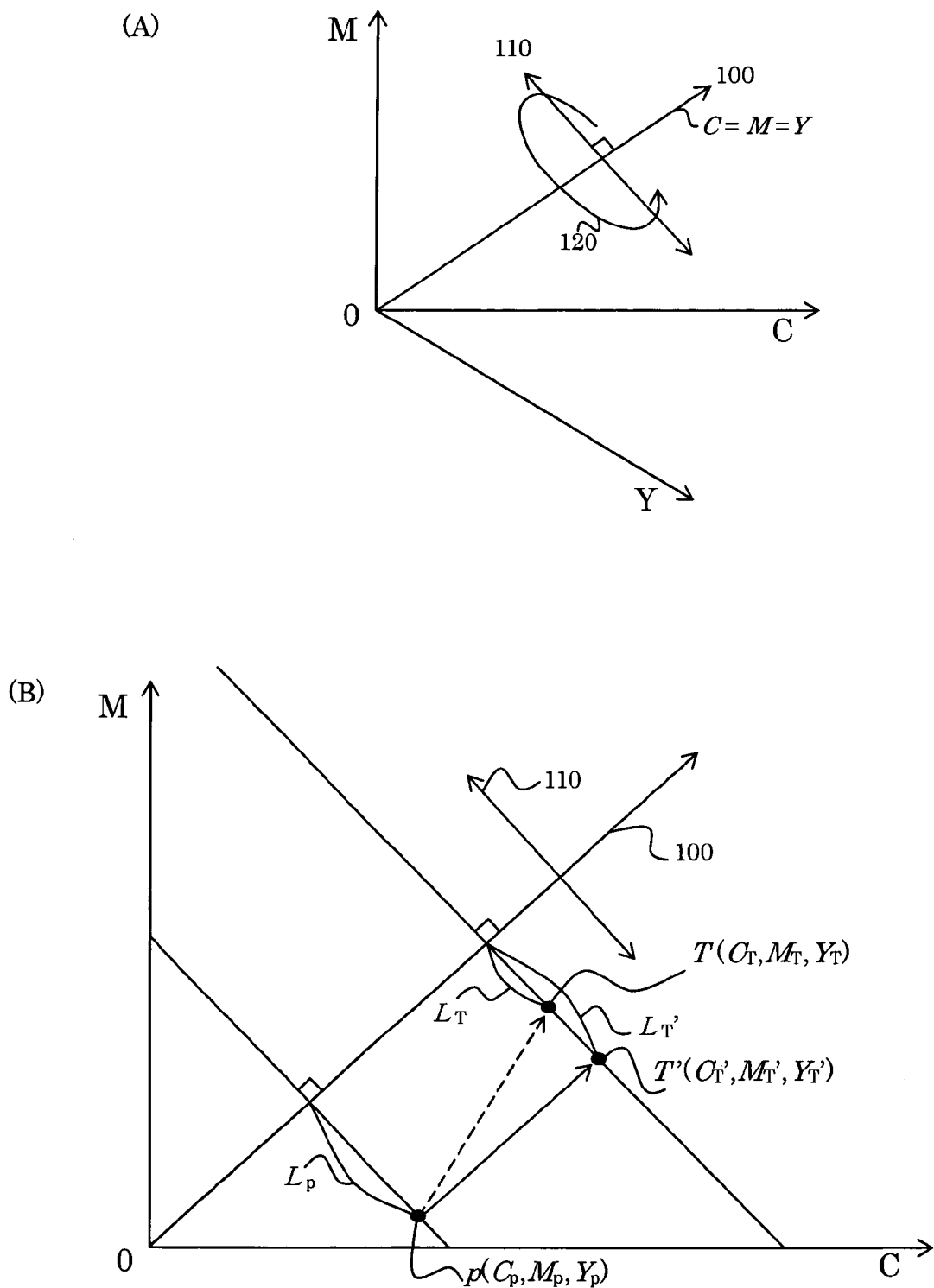
FIG. 13 is a drawing showing the grid point "p", the grid point "T" and the grid point "T'" in the virtual CMY space.

A description will now be given of the chroma maintenance processing with reference to FIG. 13.

FIG. 13(A) shows the virtual CMY space. The virtual CMY space is represented by a C axis, an M axis, and a Y axis. A lightness axis 100 is a line satisfying C=M=Y in the virtual CMY space, and color data specified by a color coordinate on the lightness axis 100 represents gray. The lightness changes along the lightness axis 100. It should be noted that the chroma changes along a line orthogonal to the lightness axis 100, namely a chroma axis 110, and the hue changes in a hue direction 120 about the lightness axis 100 on a plane perpendicular to the lightness axis 100.

FIG. 13(B) shows a CM plane in the virtual CMY space shown in FIG. 13(A). The chroma maintenance processing is described on the CM plane for the sake of simple description. In FIG. 13(B), the horizontal axis and the vertical axis represent the C axis and the M axis respectively. It should be noted that the lightness axis 100 in the FIG. 13(A) is projected on the CM plane.

A color coordinate of the grid point "p" is represented as $(C_p, M_p, Y_p)$ in the virtual CMY space. It is assumed that a target point of the smoothing of the grid point "p" in the virtual CMY is a point T, and the color coordinate of the point T is represented as $(C_T, M_T, Y_T)$.

The respective minimum distances from the grid point "p" and the point "T" to the lightness axis 100 are denoted as $L_p$ and $L_T$. If the shortest distance from the respective grid point to the lightness axis 100 corresponds to the chroma represented by the color data at that grid point, the chroma values of the grid point "p" and the point "T" respectively corresponds to the $L_p$ and $L_T$.

In FIG. 13(B), the positional relationship between the grid point "p" and the point T is "$L_T<L_p$", the chroma at the point T is lower than the chroma at the grid point "p". In this case, to avoid the decrease of the chroma, a position T' (color coordinate $(C_T', M_T', Y_T')$) which satisfies "$L_T'=L_p$" is set as a target point in the virtual CMY in place of the point T. On this occasion, the chroma at the point T' is the same as that at the grid point "p". Further, the lightness and the hue at the point T' are equal to those at the point T.

In this way, if the chroma represented by the color data decreases due to the smoothing, the target color coordinate in the virtual CMY is changed from the color coordinate at the point T to the color coordinate at the point T', thereby maintaining the chroma constant without changing the lightness and the hue of the color data.

If the target color coordinate is changed from the point T to the point T' in the virtual CMY, the equation (A-1-6) is changed as:

$$E_v = |W_v \cdot (K \cdot I_p - V_T')|^2 \quad \text{(B-7)}$$

where a virtual CMY vector $V_T'$ is a vector held at the point T'. It should be noted that the point T' satisfies "$L_T'=L_p$".

Vector components of a virtual CMY vector $K \cdot I_p$ ($=V_p$) at the grid point "p" and the vector components of the target virtual CMY vector $V_T'$ at the point T' are respectively represented as:

$$V_p \begin{pmatrix} C_p \\ M_p \\ Y_p \end{pmatrix} \quad \text{(B-8)}$$

$$V_T' \begin{pmatrix} C_T' \\ M_T' \\ Y_T' \end{pmatrix} \quad \text{(B-9)}$$

The following equation is obtained by assigning the equations (B-8) and (B-9) to the equation (B-7).

$$E_v = \left| W_v \cdot \left( \begin{pmatrix} C_p \\ M_p \\ Y_p \end{pmatrix} - \begin{pmatrix} C_T' \\ M_T' \\ Y_T' \end{pmatrix} \right) \right|^2 \quad \text{(B-10)}$$

In this way, if the target point T in the virtual CMY space satisfies "$L_T<L_p$", the equation (B-10) is used for the point T' satisfying "$L_T'=L_p$", thereby maintaining the chroma of the color data constant before and after the smoothing. Then, the processing from (A-1-7) is carried out.

A description will now be given of a variation to the chroma maintenance processing.

First Variation

In a first variation, a chroma ratio is considered where the chroma ratio is specified by a ratio of the chroma of color data to the maximum chroma determined by the lightness and the hue of the color data. Namely, in the smoothing according to the present variation, the chroma ratio of color data before the smoothing and the chroma ratio of color data after the smoothing are approximately the same.

A description will now be given of calculation of $E_v$ according to the present variation with reference to FIG. 14.

Figure 14:
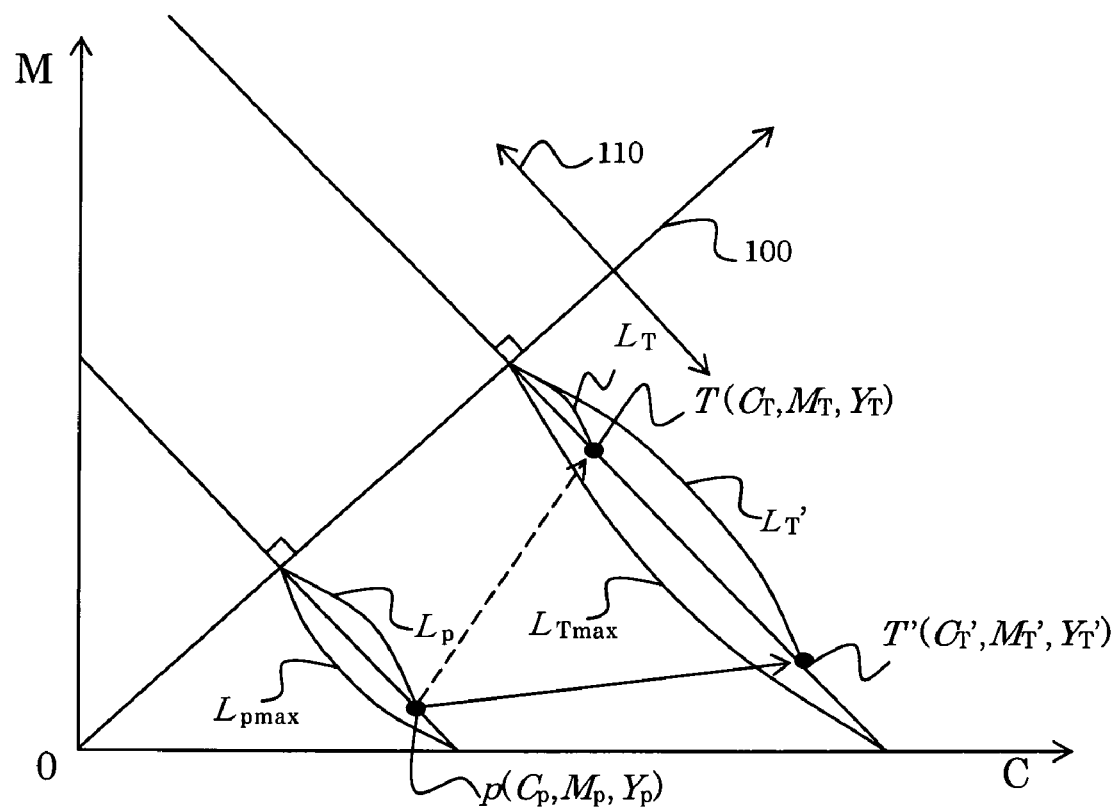
FIG. 14 is a drawing showing the grid point "p", the grid point "T" and the grid point "T'" in the virtual CMY space according to the first variation.

FIG. 14 shows the CM plane and the lightness axis 100 projected on the CM plane. It is assumed that the color coordinate of the grid point "p" in the virtual CMY is ($C_p$, $M_p$, $Y_p$), and the color coordinate of the point T is ($C_T$, $M_T$, $Y_T$).

The chroma at the grid point "p" is $L_p$, and the chroma at the point T is $L_T$. The maximum chroma determined by the lightness and the hue at the grid point "p" is denoted as $L_{pmax}$, the maximum chroma determined by the lightness and the hue at the point T is denoted as $L_{Tmax}$.

In the first variation, if the chroma $L_T$ at the point T satisfies "$(L_T/L_{Tmax})<(L_p/L_{pmax})$", it is considered that the chroma decreases. In this case, to avoid the decrease of the chroma, a position T' (color coordinate ($C_T'$, $M_T'$, $Y_T'$)) which satisfies "$(L_T'/L_{Tmax})=(L_p/L_{pmax})$" is set as a target point in the virtual CMY in place of the point T. Further, the lightness and the hue at the point T' are respectively equal to those at the point T.

In this way, if the chroma ratio of the color data decreases due to the smoothing, the target coordinate in the virtual CMY is changed from the color coordinate at the point T to the color coordinate at the point T', thereby maintaining the chroma ratio constant without changing the lightness and the hue of the color data.

In this case, the cost $E_v$ is calculated using the equation (B-10) described in the present embodiment. It should be noted that the virtual CMY vector $V_T'$ is a vector which satisfies "$(L_T'/L_{max})<(L_p/L_{pmax})$" in the equation (B-10). In this way, if the target point T in the virtual CMY space satisfies "$(L_T/L_{Tmax})<(L_p/L_{pmax})$", the equation (B-10) is used for the point T' satisfying "$(L_T'/L_{Tmax})=(L_p/L_{pmax})$", thereby maintaining the chroma ratio of the color data constant before and after the smoothing.

Second Variation

A description will now be given of a second variation of how to calculate the cost $E_v$ due to a deviation from the target virtual CMY. Though the second variation is the same as the first variation in maintaining the chroma ratio constant, the same processing as the first variation is carried out only if the color data at a grid point before the smoothing presents the maximum chroma value in the present variation.

As a result, if the color data at a grid point presents the maximum chroma value before the smoothing, the color data after the smoothing maintains the maximum chroma value.

Third Variation

A description will now be given of a third variation of how to calculate the cost $E_v$ due to a deviation from the target virtual CMY. Though the third variation is the same as the first and second variations in maintaining the chroma ratio constant, the chroma ratio of the color data is maintained approximately constant before and after the smoothing if the color data at a grid point before the smoothing does not have at least one color of CMY constituting the color data in the third variation.

Figure 15:
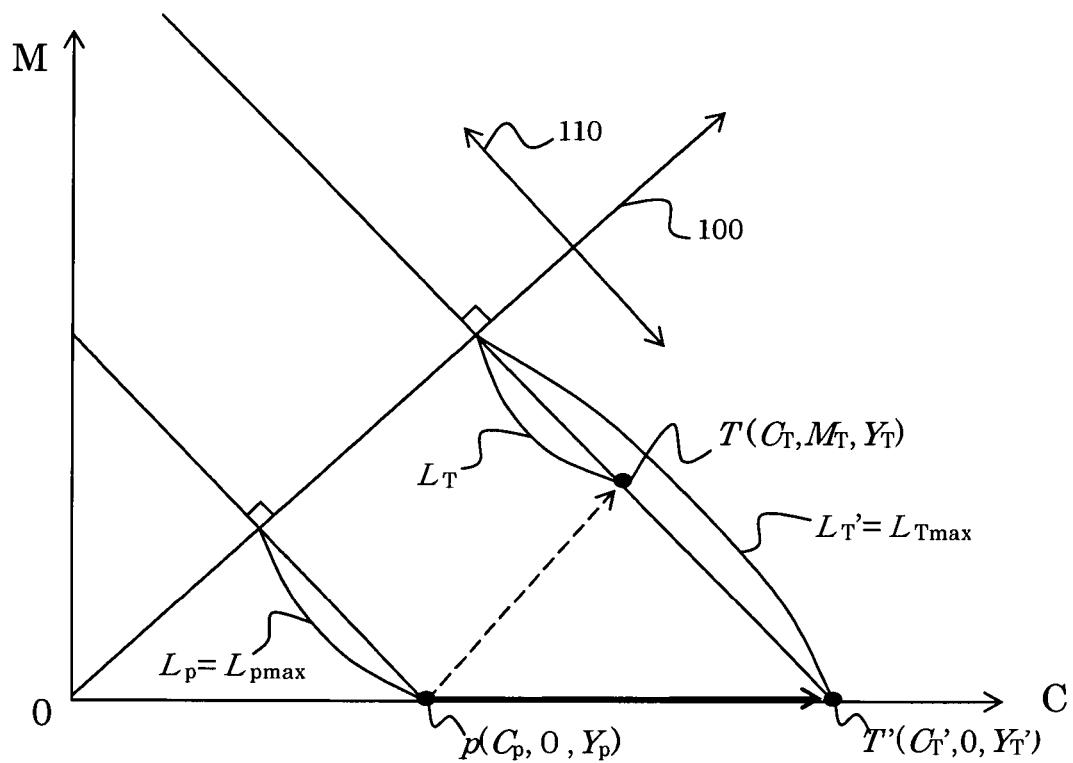
FIG. 15 is a drawing showing the grid point "p", the grid point "T" and the grid point "T'" in the virtual CMY space according to the third variation.

A description will now be given of calculation of $E_v$ according to the third variation with reference to FIG. 15. FIG. 15 shows the CM plane and the lightness axis 100 projected on the CM plane as in the case of FIG. 14. The color coordinate of a grid point "p" in FIG. 15 is ($C_p$, 0, $Y_p$), and does not include M of the element colors of CMY. Thus, if a target point T in the virtual CMY (color coordinate ($C_T$, $M_T$, $Y_T$) ($M_T \neq 0$)) satisfies "$(L_T/L_{Tmax})<(L_p/L_{pmax})$", the chroma decreases, and also the element color M which is not contained in the color data before the smoothing is contained. However, according to the third example, a point T' which satisfies "$(L_T/L_{Tmax})=(L_p/L_{pmax})$", namely the point T' at a color coordinate ($C_T'$, 0, $Y_T'$), is employed as a target coordinate in the virtual CMY in place of the coordinate of the point T. Therefore, color data after the smoothing can be caused not to include an element color which is not included in the color data before the smoothing, and simultaneously, the chroma of the color data before and after the smoothing can be maintained constant.

(C) Third Embodiment (Program File Producing Device)

Figure 16:
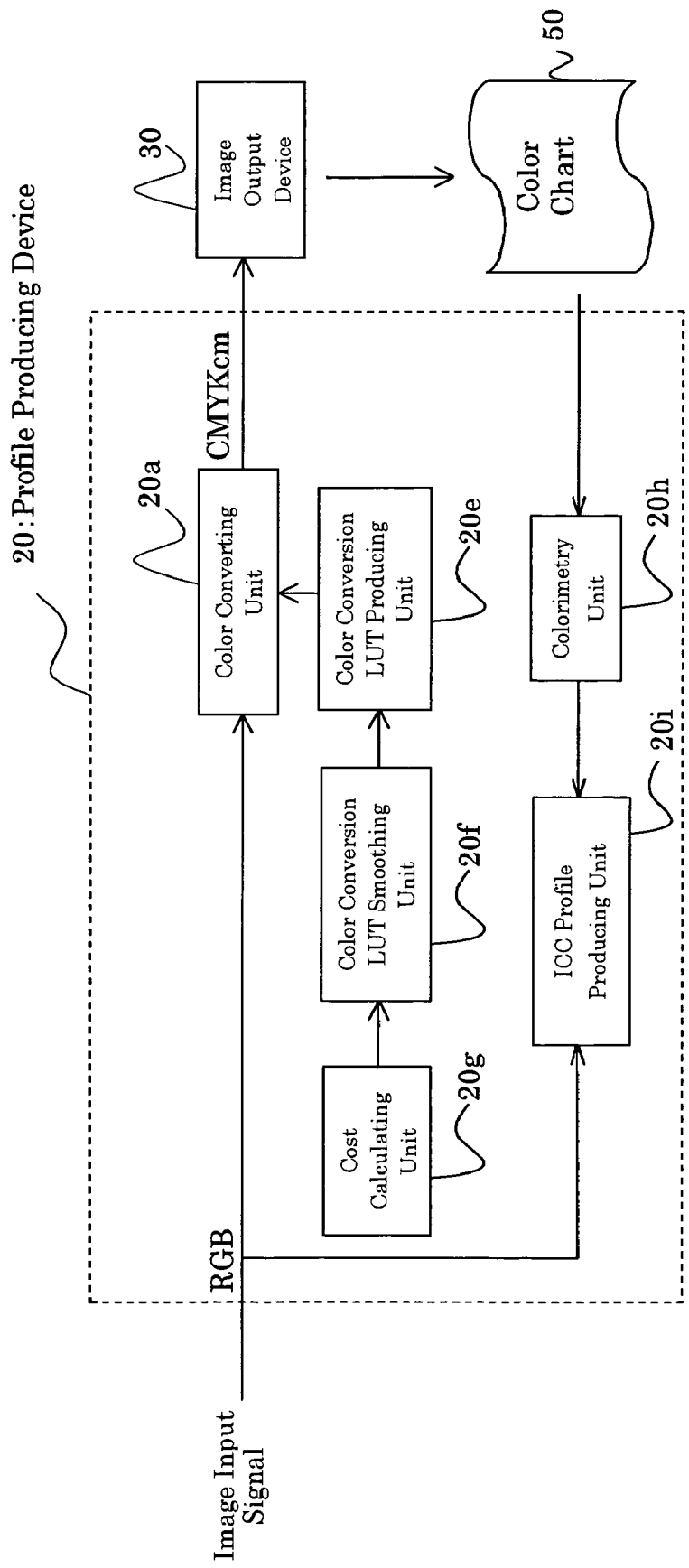
FIG. 16 shows a function block diagram of a profile producing device 20 according to an embodiment of the present invention.

FIG. 16 shows a function block diagram of a profile producing device 20 according to an embodiment of the present invention. A specific hardware constitution example of the profile producing device 20 is the same as the schematic block diagram according to the first embodiment in FIG. 2, and thus, a description will be omitted.

It should be noted that "profile" described in the claims corresponds to "ICC profile" according to the present embodiment. The ICC profile is a color conversion table compliant with specifications of the ICC (International Color Consortium). A "color conversion table" implies a table for converting device values (such as RGB values) to ink quantities (such as CMYKcm), and the device value is dependent on a color reproduction characteristic of an image output device which is a separation characteristic, and is not applied with specific color correction as in the case of a color correction table. In a description below, the color conversion table may be simply referred to as "color conversion LUT'" for the sake of simplicity of the description.

"Smoothed table producing means" described in the claims corresponds to a cost calculating unit 20g, a color conversion LUT smoothing unit 20f, and a color conversion LUT producing unit 20e, and "color chart producing means" corresponds to a color converting unit 20a.

Constitution of Profile Producing Device

FIG. 16 is the function block diagram of the profile producing device 20 according to the embodiment of the present invention. The color converting unit 20a of the profile producing device 20 converts input RGB image data to CMYKcm image data, and causes a printer as an image output device 30 to print a color chart 50 based on the converted CMYKcm image data. On the other hand, an ICC profile producing unit 20i of the profile producing device 20 uses colorimetry data of the printed color chart to produce an ICC profile.

The image data are produced by separating a color image into predetermined element colors, and representing intensities in these respective element colors, which are chromatic colors, and may be mixed into achromatic colors typified by gray and black if they are mixed at predetermined ratios.

The color chart represents output results of the image output device 30 arranged on predetermined areas when the respective RGB values of an image input signal shown in FIG. 16 are independently changed in the tone from 0 to 255 at a predetermined tone step. It is assumed that the respective RGB values of the image input signal and the corresponding arranged locations of the output results are known in advance.

Though, in the present embodiment, a description is given of a case where the profile producing device 20 produces an ICC profile used for color conversion from RGB to Lab, an ICC profile used for other color conversion can be produced in the same manner. Namely, there can be produced an ICC profile used for color conversion from device values (such as RGB values, CMY values, and CMYK values) dependent on the color reproduction characteristic of the image output device to colorimetry values (Lab values, Luv values, XYZ values, and CIE CAM97S) indicating appearance of a color.

The profile producing device 20 shown in FIG. 16 is comprised of the cost calculating unit 20g for calculating a function (referred to as "evaluation function" hereinafter) E for evaluating a level of smoothing of data at respective lattice points (grid points) after the color conversion, the color conversion LUT smoothing unit 20f for carrying out smoothing processing using costs calculated by the cost calculating unit 20g, the color conversion LUT producing unit 20e for producing a color conversion LUT capable of enhancing continuity of color data when CMY data are converted to CMYKcm data using the smoothed data at the respective grid points, the color converting unit 20a for converting the RGB data to the CMYKcm data using the color conversion LUT produced by the color conversion LUT producing unit 20e, and the ICC profile producing unit 20i for producing an ICC profile using values color-metered by a colorimetry unit 20h.

Profile Producing Processing Control Program

A profile producing processing control program according to the present invention is usually recorded on a recording medium such as a floppy disk or a CD-ROM in a form readable by the computer 12, and circulated. The program is read by a media reader (such as a CD-ROM drive 13c and a floppy disk drive 13a), and then, is installed on a hard disk 13b. There is such a constitution that a CPU then properly reads a desired program from the hard disk 13b, and carries out desired processing. It should be noted that the profile producing processing control program according to the present invention itself constitutes a part of the invention of the present application.

A description will now be given of the profile producing processing control program executed by the profile producing device 20 shown in FIG. 16 with reference to FIG. 17 and FIG. 18.

Figure 17:
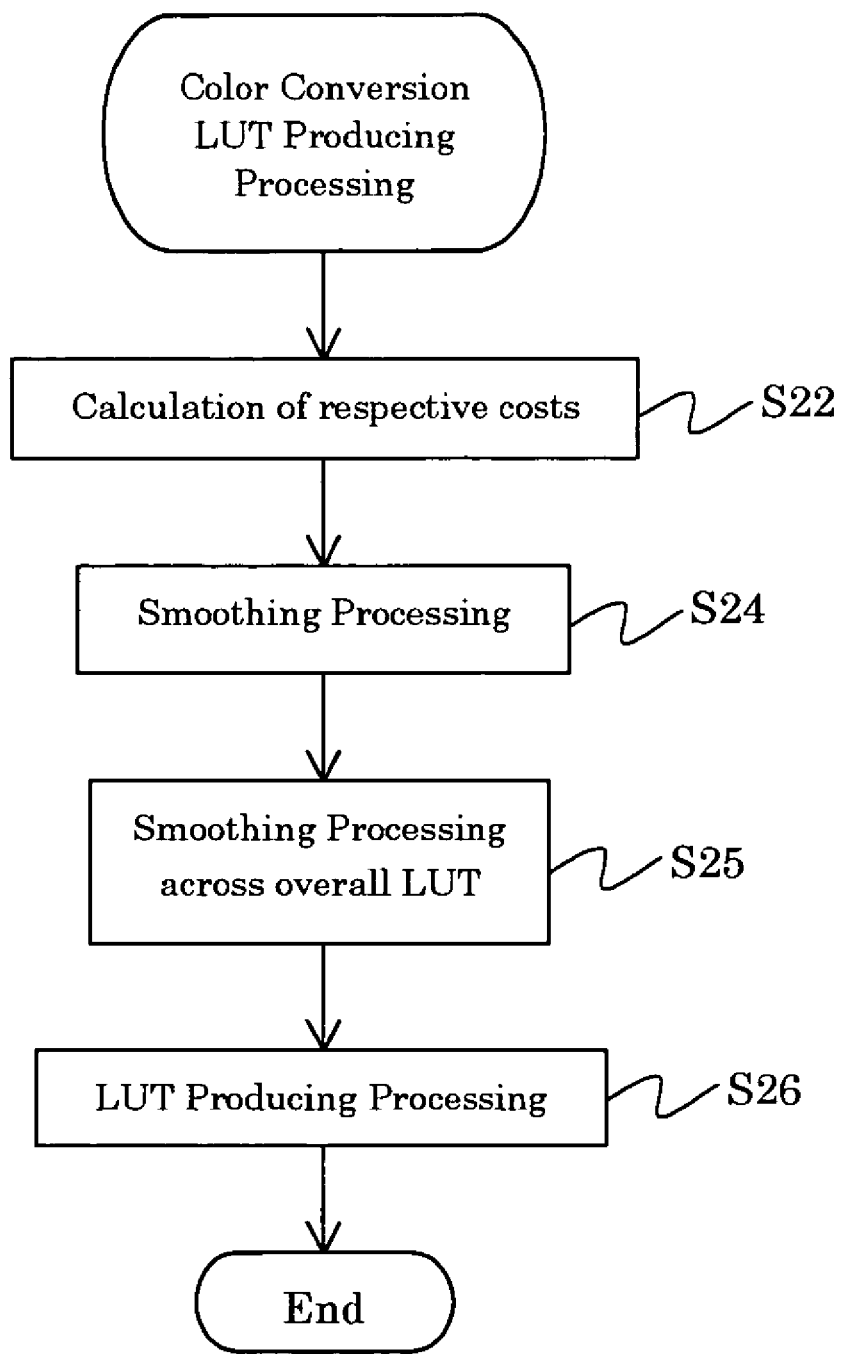
FIG. 17 shows a flowchart showing an operation of the profile producing device 20 when the color conversion LUT is produced.

FIG. 17 shows a flowchart showing an operation of the profile producing device 20 when the color conversion LUT is produced.

As FIG. 17 shows, first, the cost calculating unit 20g carries out calculation processing for the respective costs of the evaluation function E which is a function for evaluating the level of smoothing of data at the respective grid points after the color conversion (step S22). The calculation processing for the respective costs is similar to that of the first example of the first embodiment, and thus, a description will be omitted.

Then the color conversion LUT smoothing unit 20f carries out the smoothing processing at the respective grid points (step S24). The smoothing processing is also similar to that of the first example of the first embodiment, and thus, a description will be omitted.

Then, the color conversion LUT smoothing unit 20f carries out the smoothing processing across the entire color conversion LUT (step S25). The smoothing processing across the entire color conversion LUT is also similar to that of the first example of the first embodiment, and thus, a description will be omitted.

Then, after the smoothing processing across the entire LUT (step S25), the procedure returns to the step S26 in FIG. 17, and the color conversion LUT producing unit 20e produces the color conversion LUT (step S26).

The procedure described above can produce the color conversion LUT capable of enhancing continuity of the color conversion of the image data by correcting jumps of the separation characteristic.

Figure 18:
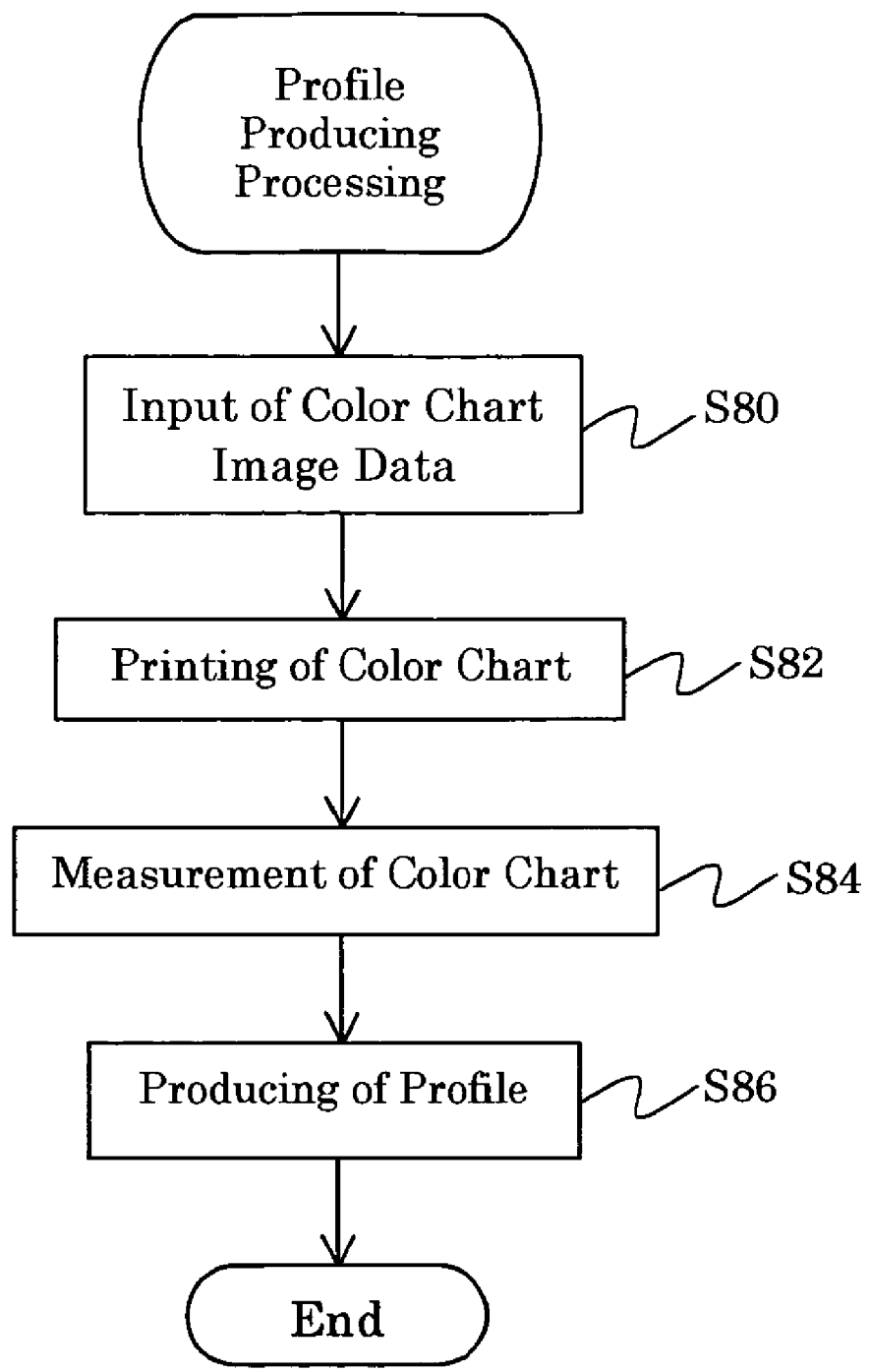
FIG. 18 is a flowchart showing an operation of the profile producing device 20 when the ICC profile is produced.

FIG. 18 is a flowchart showing an operation of the profile producing device 20 when the ICC profile is produced using the color conversion LUT produced by the color conversion LUT producing processing described in FIG. 17.

First, RGB image data for producing the color chart 50 is transmitted to the color converting unit 20a and the ICC profile producing unit 20i (step S80). Then, the color converting unit 20a refers to the color conversion LUT produced by the color conversion LUT producing unit 20e so as to carry out the color conversion from the RGB image data to the CMYKcm image data using interpolation, creates the color chart 50 from the CMYKcm image data after the color conversion, and causes the printer as the image output device 30 to print the produced color chart 50 (step S82).

In this way, the profile producing device 20 according to the present embodiment uses the color conversion LUT to produce the color chart 50, where the color conversion LUT is produced using the evaluation function E, namely the color conversion LUT can enhance the continuity of the color conversion of the image data by correcting the jumps in the separation characteristic.

Then, the colorimetry unit 20h measures colors at the respective lattice points in the printed color chart 50 (step S84). The colorimetry unit 20h color-meters the respective colors as Lab data in the Lab space.

Then, the profile producing unit 20i corresponds the RGB data as the image input data in respective predetermined areas on the color chart obtained in the step S80 and the Lab data as the color-metered values by the colorimetry unit 20h in the respective predetermined areas to each other, thereby producing the ICC profile (step S86).

In this way, the profile producing device 20 according to the present embodiment uses the color chart 50 to produce the ICC profile used for converting RGB data to Lab data where the color chart 50 is produced using the color conversion LUT capable of enhancing the continuity of the color conversion of image data by correcting the jumps in the separation characteristic. In this way, it is possible to prevent tone jumps in an image after the color conversion by carrying out the color conversion using the ICC profile produced by the profile producing device 20.

Though the above description for the present invention is given of the one embodiment, the technical scope of the present invention is not limited to the above description, and the above embodiment may be modified or improved.

The invention claimed is:

1. An image processing device comprising:
a first color conversion unit that converts RGB image data to CMY image data;
a color conversion table storing unit that stores at least a color conversion table produced by a color conversion table producing device;
a second color converting unit that converts the CMY image data to CMYKcm data on the basis of the color conversion table, which is selected by a color conversion table selecting unit and which is read from the color conversion table storing unit;
wherein said image processing device carries out image processing using said color conversion table produced by obtaining ink-quantity vectors $I_p$, which are retained by a certain grid point "p" and which minimize a smoothing level evaluation function E used for evaluating a smoothing level at respective lattice point data after color conversion by the color conversion table, at the respective grid points,
wherein said smoothing level evaluation function E includes an evaluation function Eit based on a twisted quantity of an ink-quantity vector before and after the conversion using the color conversion table,
wherein the evaluation function Eit is represented as a mathematical expression (A-1-3), $$E_{it} = \sum_{t=1}^{T} \sum_{r=1}^{R} \left| \frac{I_p + I_{ptr} - I_{pr} - I_{pt}}{D_t} \right|^2 \qquad \text{(A-1-3)}$$

and wherein "t" is a suffix, which denotes a certain grid point $p_t$, "T" denotes the number of $p_t$, "r" is a suffix, which denotes a certain grid point $p_r$, "R" denotes the number of $p_r$, $D_t$ denotes a transition distance at "t," the respective grid points "p," $p_r$, $p_t$, and $P_{tr}$ retain ink-quantity vectors $I_p$, $I_{pr}$, $I_{pt}$, and $I_{ptr}$, a grid point neighboring a certain grid point "p" is denoted as $p_r$, a grid point other than the grid point $p_r$ neighboring the grid point "p" is denoted as $p_t$ and a grid point which has the same positional relationship with the grid point $p_t$ as the grid point "p" has with the grid point $p_r$ is denoted as $P_{tr}$.

2. The image processing device according to claim 1, wherein said smoothing level evaluation function includes an evaluation function based on a twisted quantity in a virtual CMY space.

3. The image processing device according to claim 1, wherein said twisted quantities are corrected both in said ink-quantity space and said three-dimensionalized virtual CMY space so as to correct the twisted quantities while maintaining continuity of the space before and after compression of the dimension.

4. The image processing device according to claim 1, wherein said smoothing level evaluation function includes an evaluation function based on a deviation level from a target ink quantity.

5. The image processing device according to claim 1, wherein said smoothing level evaluation function includes an evaluation function based on a deviation level from target virtual CMY.

6. The image processing device according to claim 1, wherein said smoothing level evaluation function includes an evaluation function based on an excess level from an ink quantity limitation.

7. The image processing device according to claim 1, wherein said smoothing level evaluation function includes an evaluation function based on an ink quantity reduced to minus.

8. The image processing device according to claim 1, wherein said smoothing level evaluation function includes an evaluation function based on ink generation.

9. An image processing method for carrying out image processing performed by using an image processing device, wherein the image processing device includes a first color conversion unit that converts RGB image data to CMY image data, a color conversion table storing unit that stores at least a color conversion table produced by a color conversion table producing device, a second color converting unit that converts the CMY image data to CMYKcm data on the basis of the color conversion table, which is selected by a color conversion table selecting unit and which is read from the color conversion table storing unit, said image processing using the color conversion table produced by obtaining ink-quantity vectors $I_p$, which are retained by a certain grid point "p" and which minimize a smoothing level evaluation function E used for evaluating a smoothing level at respective lattice point data after color conversion by the color conversion table, at the respective grid points, wherein said smoothing level evaluation function E includes an evaluation function Eit based on a twisted quantity of an ink-quantity vector before and after the conversion using the color conversion table, wherein the evaluation function Eit is represented as a mathematical expression (A-1-3), $$E_{it} = \sum_{t=1}^{T} \sum_{r=1}^{R} \left| \frac{I_p + I_{ptr} - I_{pr} - I_{pt}}{D_t} \right|^2 \qquad \text{(A-1-3)}$$

and wherein "t" is a suffix, which denotes a certain grid point $p_t$, "T" denotes the number of $p_t$, "r" is a suffix, which denotes a certain grid point $p_r$, "R" denotes the number of $p_r$, $D_t$ denotes a transition distance at "t," the respective grid points "p," $p_r$, $p_t$, and $p_{tr}$ retain ink-quantity vectors $I_p$, $I_{pr}$, $I_{pt}$, and $I_{ptr}$, a grid point neighboring a certain grid point "p" is denoted as $p_r$, a grid point other than the grid point $p_r$ neighboring the grid point "p" is denoted as $p_t$, and a grid point which has the same positional relationship with the grid point $p_t$ as the grid point "p" has with the grid point $p_r$ is denoted as $p_{tr}$.

10. A computer-readable medium storing a computer program of instructions for execution by the computer to perform image processing using a color conversion table produced by obtaining ink-quantity vectors $I_p$, which are retained by a certain grid point "p" and which minimize a smoothing level evaluation function E used for evaluating a smoothing level at respective lattice point data after color conversion by the color conversion table, at the respective grid points, wherein said smoothing level evaluation function E includes an evaluation function Eit based on a twisted quantity of an ink-quantity vector before and after the conversion using the color conversion table, wherein the evaluation function Eit is represented as a mathematical expression (A-1-3), $$E_{it} = \sum_{t=1}^{T} \sum_{r=1}^{R} \left| \frac{I_p + I_{ptr} - I_{pr} - I_{pt}}{D_t} \right|^2 \qquad \text{(A-1-3)}$$

and wherein "t" is a suffix, which denotes a certain grid point $p_t$, "T" denotes the number of $p_t$, "r" is a suffix, which denotes a certain grid point $p_r$, "R" denotes the number of $p_r$, $D_t$ denotes a transition distance at "t," the respective grid points "p," $p_r$, $p_t$, and $p_{tr}$ retain ink-quantity vectors $I_p$, $I_{pr}$, $I_{pt}$, and $I_{ptr}$, a grid point neighboring a certain grid point "p" is denoted as $p_r$, a grid point other than the grid point $p_r$ neighboring the grid point "p" is denoted as $p_t$, and a grid point which has the same positional relationship with the grid point $p_t$ as the grid point "p" has with the grid point $p_r$ is denoted as $p_{tr}$.

* * * * *